(12) United States Patent
Kataoka et al.

(10) Patent No.: US 11,147,285 B2
(45) Date of Patent: Oct. 19, 2021

(54) POWDERY FAT OR OIL COMPOSITION AND METHOD FOR PRODUCING SAME

(71) Applicant: The Nisshin Oillio Group, Ltd., Tokyo (JP)

(72) Inventors: Yutaro Kataoka, Yokohama (JP); Seiya Takeguchi, Yokohama (JP); Tetsuro Iwasawa, Yokohama (JP); Shin Arimoto, Tokyo (JP); Hidetaka Uehara, Yokohama (JP); Tomohiro Aibara, Yokohama (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 482 days.

(21) Appl. No.: 15/762,971

(22) PCT Filed: Sep. 23, 2016

(86) PCT No.: PCT/JP2016/078122
§ 371 (c)(1),
(2) Date: Mar. 23, 2018

(87) PCT Pub. No.: WO2017/051910
PCT Pub. Date: Mar. 30, 2017

(65) Prior Publication Data
US 2018/0249729 A1    Sep. 6, 2018

(30) Foreign Application Priority Data

Sep. 24, 2015 (JP) .............................. JP2015-187271

(51) Int. Cl.
*A23D 9/05* (2006.01)
*A23D 9/02* (2006.01)
*A23D 7/02* (2006.01)

(52) U.S. Cl.
CPC ................ *A23D 9/05* (2013.01); *A23D 7/02* (2013.01); *A23D 9/02* (2013.01); *A23V 2002/00* (2013.01);
(Continued)

(58) Field of Classification Search
CPC ...................................................... A23D 9/05
See application file for complete search history.

(56) References Cited

U.S. PATENT DOCUMENTS 3,796,816 A    3/1974   Hasman et al.
4,877,636 A   10/1989   Koyano et al.
(Continued)

FOREIGN PATENT DOCUMENTS

CA    2922936 A1    3/2015
CN   101909453 A   12/2010
(Continued)

OTHER PUBLICATIONS

Yang et al.,"Refined cottonseed oil as a replacement for soybean oil in broiler diet"—Food Science & Nutrition, 2019, 7, pp. 1027-1034. (Year: 2019).*
(Continued)

*Primary Examiner* — Elizabeth Gwartney
(74) *Attorney, Agent, or Firm* — Buchanan, Ingersoll & Rooney PC

(57) ABSTRACT

Provided are a powdered fat and/or oil composition, a fat and/or oil composition for producing the powdered fat and/or oil composition, and methods for producing these; a food containing the powdered fat and/or oil composition, and a method for producing the food; an adhesive and a coating which contain the powdered fat and/or oil composition, and methods for producing the adhesive and the coating. The powdered fat and/or oil composition contains a fat and/or oil ingredient containing a XXX triglyceride. At (Continued)

least a portion of the fat and/or oil ingredient is a β-form fat and/or oil, particles of the powdered fat and/or oil composition have a plate-like shape, and the powdered fat and/or oil composition has a loose bulk density of 0.05 to 0.6 g/cm³. The method produces a composition containing a β-form fat and/or oil whose particles have a plate-like shape.

18 Claims, 6 Drawing Sheets

(52) U.S. Cl.
CPC ....... *A23V 2300/24* (2013.01); *A23V 2300/38* (2013.01); *A23V 2300/40* (2013.01)

(56) References Cited

U.S. PATENT DOCUMENTS

| | | | |
|---|---|---|---|
| 5,514,406 | A | 5/1996 | Aoe et al. |
| 6,090,598 | A | 7/2000 | Yamaguchi et al. |
| 8,535,749 | B2 | 9/2013 | Kikuchi et al. |
| 9,695,384 | B2 | 7/2017 | Schweitzer et al. |
| 2006/0115882 | A1 | 6/2006 | Negishi et al. |
| 2008/0089981 | A1 | 4/2008 | Butler et al. |
| 2010/0104694 | A1 | 4/2010 | Schweitzer et al. |
| 2010/0278985 | A1 | 11/2010 | Kikuchi et al. |
| 2011/0052771 | A1 | 3/2011 | Rumbaut et al. |
| 2011/0200734 | A1 | 8/2011 | Nosaka et al. |
| 2011/0223225 | A1 | 9/2011 | Mezzenga et al. |
| 2011/0318453 | A1 | 12/2011 | Suganuma et al. |
| 2013/0230634 | A1 | 9/2013 | Arai et al. |
| 2016/0213020 | A1 | 7/2016 | Oonishi |
| 2017/0208829 | A1 | 7/2017 | Oonishi et al. |
| 2017/0267945 | A1 | 9/2017 | Schweitzer et al. |
| 2018/0027838 | A1 | 2/2018 | Suzuki et al. |
| 2018/0035688 | A1 | 2/2018 | Oonishi et al. |
| 2018/0042259 | A1 | 2/2018 | Oonishi et al. |
| 2018/0161301 | A1 | 6/2018 | Nosaka et al. |
| 2018/0256531 | A1 | 9/2018 | Nosaka et al. |
| 2019/0021355 | A1 | 1/2019 | Takeguchi et al. |
| 2019/0021359 | A1 | 1/2019 | Kataoka et al. |
| 2019/0029283 | A1 | 1/2019 | Kataoka et al. |
| 2019/0031976 | A1 | 1/2019 | Takeguchi et al. |

FOREIGN PATENT DOCUMENTS

| | | |
|---|---|---|
| CN | 102421883 A | 4/2012 |
| CN | 103402364 A | 11/2013 |
| CN | 106536696 A | 3/2017 |
| CN | 107249344 A | 10/2017 |
| CN | 107249346 A | 10/2017 |
| CN | 107404893 A | 11/2017 |
| CN | 108024550 A | 5/2018 |
| DE | 2832636 A1 | 3/1980 |
| EP | 0209327 A2 | 1/1987 |
| EP | 0 536 824 B1 | 11/1995 |
| EP | 1776870 B1 | 7/2011 |
| EP | 2 622 966 A1 | 8/2013 |
| EP | 2839750 A1 | 2/2015 |
| EP | 3173464 A1 | 5/2017 |
| EP | 3 262 948 A1 | 1/2018 |
| EP | 3 262 949 A1 | 1/2018 |
| GB | 879211 A | 10/1961 |
| GB | 1316079 A | 5/1973 |
| GB | 1564363 A | 4/1980 |
| JP | 52-071390 A | 6/1977 |
| JP | 63-240745 A | 10/1988 |
| JP | H-02299544 A | 12/1990 |
| JP | H03-287880 A | 12/1991 |
| JP | 05-137506 A | 6/1993 |
| JP | 2700377 B2 | 10/1993 |
| JP | 2646422 B2 | 12/1993 |
| JP | 06-33087 A | 2/1994 |
| JP | 06-245700 A | 9/1994 |
| JP | H-08-27 B2 | 1/1996 |
| JP | 08205773 | 8/1996 |
| JP | 10295307 A | 11/1998 |
| JP | 03083967 B2 | 9/2000 |
| JP | 2002539782 A | 11/2002 |
| JP | 2003135001 A | 5/2003 |
| JP | 2005073610 A | 3/2005 |
| JP | 2005-350660 A | 12/2005 |
| JP | 2006000087 A | 1/2006 |
| JP | 3817450 B2 | 9/2006 |
| JP | 2007236289 A | 9/2007 |
| JP | 2007-289116 A | 11/2007 |
| JP | 4352103 B2 | 7/2009 |
| JP | 2009-249614 A | 10/2009 |
| JP | 2012157370 A | 8/2012 |
| JP | 2012249617 A | 12/2012 |
| JP | 5501764 B2 | 5/2014 |
| JP | 2014124093 A | 7/2014 |
| JP | 2014212731 A | 11/2014 |
| JP | 2015-070837 A | 4/2015 |
| WO | 2005005586 A1 | 1/2005 |
| WO | 2008104381 A1 | 9/2008 |
| WO | 2008123946 A1 | 10/2008 |
| WO | 2010052847 A1 | 5/2010 |
| WO | 2011134627 A1 | 11/2011 |
| WO | 2012043548 A1 | 4/2012 |
| WO | 2012/169457 A1 | 12/2012 |
| WO | 2014/069218 A1 | 5/2014 |
| WO | 2014087724 A1 | 6/2014 |
| WO | WO 2016/013582 A1 | 1/2016 |

OTHER PUBLICATIONS

Ribeiro et al. ,"Crystallization modifier in lipid systems"—J. Food Sci Technol., (Jul. 2015) 52(7), pp. 3925-3946 (Year: 2015).*
Kichinosuke (JP 2006 109731 A—IP.com translation) (Year: 2006).*
Ishikawa et al.: "Polymorphic Behavior of Palm Oil and Modified Palm Oils," Food Science and Technology International, Tokyo, Nihon-Shokuhin-Kagaku-Kôgakkai, JP, vol. 3, No. 1, Jan. 1, 1997, pp. 77-81.
Extended Search Report issued by the European Patent Office in corresponding European Patent Application No. 16848698.3-1106 dated May 22, 2019.
International Search Report (PCT/ISA/210) dated Dec. 6, 2016, by the Japanese Patent Office as the International Searching Authority for International Application No. PCT/JP2016/078122.
Written Opinion (PCT/ISA/237) dated Dec. 6, 2016, by the Japanese Patent Office as the International Searching Authority for International Application No. PCT/JP2016/078122.
International Search Report (PCT/ISA/210) dated Oct. 27, 2015, by the Japanese Patent Office as the International Searching Authority for International Application No. PCT/JP2015/070850.
Written Opinion (PCT/ISA/237) dated Oct. 27, 2015, by the Japanese Patent Office as the International Searching Authority for International Application No. PCT/JP2015/070850.
International Search Report (PCT/ISA/210) dated May 10, 2016, by the Japanese Patent Office as the International Searching Authority for International Application No. PCT/JP2016/055420.
Written Opinion (PCT/ISA/237) dated May 10, 2016, by the Japanese Patent Office as the International Searching Authority for International Application No. PCT/JP2016/055420.
International Search Report (PCT/ISA/210) dated May 10, 2016, by the Japanese Patent Office as the International Searching Authority for International Application No. PCT/JP2016/055421.
Written Opinion (PCT/ISA/237) dated May 10, 2016, by the Japanese Patent Office as the International Searching Authority for International Application No. PCT/JP2016/055421.
International Search Report (PCT/ISA/210) dated May 10, 2016, by the Japanese Patent Office as the International Searching Authority for International Application No. PCT/JP2016/055422.
Written Opinion (PCT/ISA/237) dated May 10, 2016, by the Japanese Patent Office as the International Searching Authority for International Application No. PCT/JP2016/055422.

(56) References Cited

OTHER PUBLICATIONS

International Search Report (PCT/ISA/210) dated Mar. 7, 2017, by the Japanese Patent Office as the International Searching Authority for International Application No. PCT/JP2017/001951.
Written Opinion (PCT/ISA/237) dated Mar. 7, 2017, by the Japanese Patent Office as the International Searching Authority for International Application No. PCT/JP2017/001951.
International Search Report (PCT/ISA/210) and the Written Opinion of the International Searching Authority (Form PCT/ISA/237) dated Mar. 7, 2017, by the Japanese Patent Office in the International Application No. PCT/JP2017/001952. (7 pages).
International Search Report (PCT/ISA/210) and the Written Opinion of the International Searching Authority (Form PCT/ISA/237) dated Mar. 7, 2017, by the Japanese Patent Office in the International Application No. PCT/JP2017/001953. (10 pages).
International Search Report (PCT/ISA/210) and the Written Opinion of the International Searching Authority (Form PCT/ISA/237) dated Mar. 7, 2017, by the Japanese Patent Office in the International Application No. PCT/JP2017/001954. (9 pages).
Extended Search Report dated Nov. 23, 2017, by the European Patent Office in European Patent Application No. 15824376.6 (9 pages).
Communication pursuant to Article 94(3) EPC issued by the European Patent Office in European Patent Application No. 15824376.6-1105 dated Jan. 8, 2019 (6 pages).
Extended Search Report issued by the European Patent Office in European Patent Application No. 16755552.3-1106 dated Jul. 17, 2018 (8 pages).
Extended Search Report issued by the European Patent Office in European Patent Application No. 16755551.5-1105 dated Sep. 20, 2018 (9 pages).
Communication pursuant to Article 94(3) EPC issued by the European Patent Office in European Patent Application No. 16755551.5-1105 dated Aug. 23, 2019 (5 pages).
Extended Search Report issued by the European Patent Office in European Patent Application No. 16755550.7-1105 dated Aug. 6, 2018 (9 pages).
Extended Search Report issued by the European Patent Office in European Patent Application No. 17741542.9-1105 dated Aug. 14, 2019 (6 pages).
The extended European Search Report dated Aug. 30, 2019, by the European Patent Office in European Patent Application No. 17741544.5. (7 pages).
The extended European Search Report dated Sep. 9, 2019, by the European Patent Office in European Patent Application No. 17741543.7. (8 pages).
The extended European Search Report dated Jan. 24, 2020, by the European Patent Office in European Patent Application No. 17741545.2. (11 pages).
The First Office Action issued by the State Intellectual Property Office of People's Republic of China in Chinese Patent Application No. 201580040036.5 dated Mar. 28, 2010 (17 pages including partial English translation).
Office Action dated Dec. 25, 2019, by the State Intellectual Property Office of the People's Republic of China in Chinese Patent Application No. 201680012188.9 and an English translation of the Office Action. (17 pages).
First Office Action dated Feb. 27, 2020, by the State Intellectual Property Office of People's Republic of China in Chinese Patent Application No. 201680012214.8, with an English translation of the Office Action. (17 pages).
The First Office Action dated Apr. 8, 2020, by the State Intellectual Property Office of People's Republic of China in Chinese Patent Application No. 201780007637.5, and an English translation of the Office Action. (21 pages).
Office Action (First Office Action) dated Apr. 28, 2020, by the State Intellectual Property Office of People's Republic of China in Chinese Patent Application No. 201780007669.5 and an English Translation of the Office Action. (17 pages).

Office Action dated Jun. 14, 2017, by the Japanese Patent Office for Application No. 2017-522695.
Office Action dated Jun. 14, 2017, by the Japanese Patent Office in Japanese Patent Application No. 2017-522697. (2 pages).
Japanese Patent Office Publication, Hyoujun Gijutsu-Shu, 2006 (Flavors), 2-2 Processing Techniques for Flavors, 2-2-2 Powders and Granules, Published on Mar. 14, 2007, pp. 328-330 (4 pages including partial English translation).
Amir et al., "Interesterification of fats and oils—A Review". Pak. J. Food Sci., 22(3), pp. 143-153. (Year: 2012).
Apha F A C Gardner: "Lovibond 5.25" Cell Fatty Acid Specifications Typical Fatty Acid Composition % Packing", Nov. 19, 2008, XP055615791. (1 page).
Ciftci et al.: "Formation of solid lipid microparticles from fully hydrogenated canola oil using supercritical carbon dioxide," Journal of Food Engineering, Barking, Essex, GB, vol. 178, Jan. 19, 2016, pp. 137-144, XP029431886.
Kebakile, "The Production of a High Free-Fat Whole Milk Powder for the Chocolate Industry; The Spray Chilling Technology" Thesis, Massey University (1996) (111 pages).
Lipp et al.: "Review of cocoa butter and alternative fats for use in chocolate—Part A. Compositional data," Food Chemistry, Elsevier Ltd, NL, vol. 62, No. 1, Jan. 1, 1998, pp. 73-97.
Millqvist-Fureby: "Characterisation of spray-dried emulsions with mixed fat phases," Colloids and Surfaces. B, Biointerfaces, vol. 31, No. 1-4, Sep. 1, 2003, pp. 65-79, XP55614221, NL.
Nolen: "Biological Evaluation of Hydrogenated Rapeseed Oil," Journal of the American Oil Chemists' Society (JAOCS), vol. 58, No. 1, Jan. 1, 1981, pp. 31-37, XP55614258, DE.
Office Action issued by the U.S. Patent and Trademark Office in U.S. Appl. No. 15/553,906, dated Mar. 30, 2020, U.S. Patent and Trademark Office, Alexandria, VA. (18 pages).
Office Action issued by the U.S. Patent and Trademark Office in U.S. Appl. No. 15/553,640, dated Jun. 26, 2020, U.S. Patent and Trademark Office, Alexandria, VA. (8 pages).
Office Action issued by the U.S. Patent and Trademark Office in U.S. Appl. No. 15/327,734, dated Sep. 6, 2019, U.S. Patent and Trademark Office, Alexandria, VA. (8 pages).
Office Action issued by the U.S. Patent and Trademark Office in U.S. Appl. No. 15/553,771, dated Sep. 16, 2020, U.S. Patent and Trademark Office, Alexandria, VA. (8 pages).
Office Action issued by the U.S. Patent and Trademark Office in U.S. Appl. No. 15/553,640, dated Nov. 1, 2019, U.S. Patent and Trademark Office, Alexandria, VA. (8 pages).
Office Action issued by the U.S. Patent and Trademark Office in U.S. Appl. No. 15/553,906, dated Aug. 30, 2019, U.S. Patent and Trademark Office, Alexandria, VA. (17 pages).
Office Action issued by the U.S. Patent and Trademark Office in U.S. Appl. No. 15/553,906, dated Sep. 22, 2020, U.S. Patent and Trademark Office, Alexandria, VA. (23 pages).
Office Action issued by the U.S. Patent and Trademark Office in U.S. Appl. No. 16/071,796, dated Apr. 2, 2020, U.S. Patent and Trademark Office, Alexandria, VA. (7 pages).
Office Action issued by the U.S. Patent and Trademark Office in U.S. Appl. No. 16/071,796, dated Oct. 7, 2020, U.S. Patent and Trademark Office, Alexandria, VA. (9 pages).
Office Action issued by the U.S. Patent and Trademark Office in U.S. Appl. No. 16/071,830, dated Oct. 7, 2020, U.S. Patent and Trademark Office, Alexandria, VA. (9 pages).
Office Action dated Apr. 1, 2021, by the U.S. Patent and Trademark Office in U.S. Appl. No. 16/071,734. (12 pages).
Office Action dated Apr. 1, 2021, by the U.S. Patent and Trademark Office in U.S. Appl. No. 16/071,796. (7 pages).
Office Action dated Apr. 1, 2021, by the U.S. Patent and Trademark Office in U.S. Appl. No. 16/071,830. (7 pages).
Office Action dated Feb. 3, 2021, by the U.S. Patent and Trademark Office in U.S. Appl. No. 15/553,640. (11 pages).
Office Action dated Feb. 4, 2021, by the U.S. Patent and Trademark Office in U.S. Appl. No. 16/071,746. (13 pages).
Office Action dated Mar. 18, 2021, by the U.S. Patent and Trademark Office in U.S. Appl. No. 15/553,771. (8 pages).

(56) References Cited

OTHER PUBLICATIONS

Communication pursuant to Article 94(3) EPC dated May 11, 2021, by the European Patent Office in corresponding European Patent Application No. 16755551.5. (5 pages).
Office Action dated Jun. 8, 2021, by the U.S. Patent and Trademark Office in U.S. Appl. No. 15/553,906. (10 pages).

* cited by examiner (a)

(b)

POWDERY FAT OR OIL COMPOSITION AND METHOD FOR PRODUCING SAME

TECHNICAL FIELD

The present invention relates to a powdered fat and/or oil composition, a method for producing the same, and so forth. More specifically, the present invention relates to: a powdered fat and/or oil composition containing a fat and/or oil ingredient (at least a portion of the fat and/or oil ingredient is a β-form fat and/or oil) containing a XXX triglyceride, the powdered fat and/or oil composition characterized in that particles of the powdered fat and/or oil composition have a plate-like (sheet-like) shape, and the powdered fat and/or oil composition has a loose bulk density of 0.05 to 0.6 g/cm$^3$; a method for producing the powdered fat and/or oil composition; a food containing the powdered fat and/or oil composition; a method for producing the food; an adhesive and a coating which contain the powdered fat and/or oil composition; methods for producing the adhesive and the coating; and so forth.

BACKGROUND ART

Powdered fat and/or oil compositions have been widely used in the field of foods such as cake mixes, coffee creams, and shortenings. As the method for powdering fats and/or oils, there have been known numerous powdering methods by spray drying (Patent Literatures 1 to 3). However, in each of these conventional techniques, an emulsion has to be prepared in which a fat and/or oil is dissolved in water for the spray drying. This makes the steps complicated and increases the cost. Besides, the techniques always have problems with the stability of the emulsions. Moreover, since various emulsifiers need to be added in order to stabilize such emulsions, it has been impossible to prepare powdered fat and/or oil compositions constituted only of a fat and/or oil.

As the method for producing a powder constituted only of a fat and/or oil, there have been known: a method in which a fat and/or oil is frozen in liquid nitrogen and pulverized and other similar methods; a method in which a fat and/or oil such as a highly hydrogenated oil having a high solid fat content at normal temperature is pulverized with a pulverizer, followed by sieving to make the particle size uniform; and a method in which a fat and/or oil such as a highly hydrogenated oil having a high solid fat content at normal temperature is melted and directly sprayed (Patent Literatures 4, 5). However, all of these are complicated and not suitable for the industrialization.

CITATION LIST

Patent Literatures

Patent Literature 1: Japanese Patent Application Publication No. Hei 5-137506
Patent Literature 2: Japanese Patent Application Publication No. Hei 6-33087
Patent Literature 3: Japanese Patent Application Publication No. 2007-289116
Patent Literature 4: Japanese Patent Application Publication No. Sho 63-240745
Patent Literature 5: Japanese Patent Application Publication No. Hei 6-245700

SUMMARY OF INVENTION

Technical Problems

An object of the present invention is to provide a powdered fat and/or oil composition containing a fat and/or oil ingredient containing a XXX triglyceride and a β-form fat and/or oil, the powdered fat and/or oil composition particles having a plate-like shape, and the powdered fat and/or oil composition having a loose bulk density of 0.05 to 0.6 g/cm$^3$.

Another object of the present invention is to provide a method for producing the powdered fat and/or oil composition, the method including the steps of: preparing a fat and/or oil composition raw material containing a XXX triglyceride; and cooling and solidifying the fat and/or oil composition raw material to obtain a powdered fat and/or oil composition containing a β-form fat and/or oil whose particles have a plate-like shape.

Still another object of the present invention is to provide a β-form fat and/or oil containing the XXX triglyceride, the β-form fat and/or oil characterized in that x number of carbon atoms is an integer selected from 10 to 22, and particles of the β-form fat and/or oil have a plate-like shape and have a diffraction peak at 4.5 to 4.7 Å in an X-ray diffraction measurement.

In addition, yet another object of the present invention is to provide a food containing the powdered fat and/or oil composition, a method for producing the food, an adhesive and a coating which contain the powdered fat and/or oil composition, and methods for producing the adhesive and the coating.

Solution to Problems

To achieve the above objects, the present inventors have found out that when a powdered composition contains a fat and/or oil ingredient which contains a specific XXX triglyceride (at least one type) and a β-form fat and/or oil, the powdered composition has plate-shaped particles and a loose bulk density of 0.05 to 0.6 g/cm$^3$, so that the composition has a suitable powder form. This finding has led to the completion of the present invention. Specifically, the present invention can include the following aspects.

[1] A powdered fat and/or oil composition comprising a fat and/or oil ingredient comprising at least one type of a XXX triglyceride having fatty acid residues X, each with x carbon atoms, at positions 1 to 3 of glycerin, wherein
x number of carbon atoms is an integer selected from 10 to 22,
the fat and/or oil ingredient comprises a β-form fat and/or oil,
particles of the powdered fat and/or oil composition have a plate-like shape, and
the powdered fat and/or oil composition has a loose bulk density of 0.05 to 0.6 g/cm$^3$.
[2] The powdered fat and/or oil composition according to [1], wherein the fat and/or oil ingredient is constituted of the β-form fat and/or oil.
[3] The powdered fat and/or oil composition according to [1] or [2], comprising 50% by mass or more of the XXX triglyceride, given that a total mass of the fat and/or oil ingredient is 100% by mass.
[4] The powdered fat and/or oil composition according to any one of [1] to [3], wherein the x number of carbon atoms is an integer selected from 16 to 18.

[5] The powdered fat and/or oil composition according to any one of [1] to [4], wherein the powdered fat and/or oil composition has a loose bulk density of 0.1 to 0.4 g/cm$^3$.

[6] The powdered fat and/or oil composition according to any one of [1] to [5], wherein the plate-like shape of the powdered fat and/or oil composition has an aspect ratio of 1.1 or more.

[7] The powdered fat and/or oil composition according to any one of [1] to [6], wherein no α-form fat and/or oil is detected from the powdered fat and/or oil composition by differential scanning calorimetry.

[8] The powdered fat and/or oil composition according to any one of [1] to [7], wherein the powdered fat and/or oil composition has a diffraction peak at 4.5 to 4.7 Å in an X-ray diffraction measurement.

[9] The powdered fat and/or oil composition according to any one of [1] to [8], wherein a peak intensity ratio (a peak intensity at 4.6 Å/(the peak intensity at 4.6 Å+a peak intensity at 4.2 Å)) in an X-ray diffraction measurement of the powdered fat and/or oil composition is 0.2 or more.

[10] The powdered fat and/or oil composition according to any one of [1] to [9], wherein the powdered fat and/or oil composition comprises a β-form fat and/or oil obtained through cooling and solidification by keeping a fat and/or oil composition raw material containing a XXX triglyceride at no lower than a cooling temperature obtained from the following formula:

cooling temperature(° C.)=$x$ number of carbon atoms×6.6−68.

[11] The powdered fat and/or oil composition according to any one of [1] to [9], wherein the powdered fat and/or oil composition comprises a β-form fat and/or oil obtained through cooling and solidification by keeping a fat and/or oil composition raw material containing a XXX triglyceride at a temperature not lower than a melting point of an α-form fat and/or oil corresponding to the β-form fat and/or oil.

[12] A method for producing a powdered fat and/or oil composition comprising a fat and/or oil ingredient comprising at least one type of a XXX triglyceride having fatty acid residues X, each with $x$ carbon atoms, at positions 1 to 3 of glycerin, wherein $x$ number of carbon atoms is an integer selected from 10 to 22, at least a portion of the fat and/or oil ingredient is a β-form fat and/or oil, particles of the powdered fat and/or oil composition have a plate-like shape, the powdered fat and/or oil composition has a loose bulk density of 0.05 to 0.6 g/cm$^3$, and the method comprises the following steps of:

(a) preparing a fat and/or oil composition raw material containing a XXX triglyceride; and (d) cooling and solidifying the fat and/or oil composition raw material to obtain a powdered fat and/or oil composition comprising a β-form fat and/or oil whose particles have a plate-like shape.

[13] The method according to [12], comprising, as step (b), a step of heating the fat and/or oil composition raw material obtained in step (a) to melt the triglyceride incorporated in the fat and/or oil composition raw material, thereby obtaining the fat and/or oil composition raw material in a molten state.

[14] The method according to [12] or [13], comprising a seeding step (c1), a tempering step (c2), and/or a pre-cooling step (c3), before step (d), wherein the seeding step (c1) includes adding 0.1 to 1 part by mass of the β-form fat and/or oil to 100 parts by mass of the fat and/or oil composition raw material during the cooling in step (d), the tempering step (c2) includes, before the cooling in step (d), a step of maintaining a temperature at a temperature lower than a cooling temperature in step (d), and the pre-cooling step (c3) includes a step of pre-cooling the fat and/or oil composition in the molten state used in step (d) at a temperature higher than the cooling temperature in step (d).

[15] The method according to any one of [12] to [14], wherein the powdered fat and/or oil composition obtained in step (d) is obtained by a step of (e) pulverizing a solid resulting after the cooling in step (d) to obtain a powdered fat and/or oil composition.

[16] The method according to any one of [12] to [15], wherein the XXX triglyceride is incorporated in an amount of 50% by mass or more, given that a total mass of the fat and/or oil ingredient is 100% by mass.

[17] The method according to any one of [12] to [16], wherein $x$ number of carbon atoms is an integer selected from 16 to 18.

[18] The method according to any one of [12] to [17], wherein the cooling in step (d) is performed at a temperature not lower than a cooling temperature obtained from the following formula:

cooling temperature(° C.)=$x$ number of carbon atoms×6.6−68.

[19] The method according to any one of [12] to [17], wherein the cooling in step (d) is performed at a temperature not lower than a melting point of an α-form crystal corresponding to the β-form fat and/or oil.

[20] A β-form fat and/or oil comprising at least one type of a XXX triglyceride having fatty acid residues X, each with $x$ carbon atoms, at positions 1 to 3 of glycerin, wherein $x$ number of carbon atoms is an integer selected from 10 to 22, and particles of the β-form fat and/or oil have a plate-like shape and have a diffraction peak at 4.5 to 4.7 Å in an X-ray diffraction measurement.

[21] A food comprising the powdered fat and/or oil composition according to any one of [1] to [11].

[22] The food according to [21], comprising 0.1 to 99% by mass of the powdered fat and/or oil composition relative to 100% by mass of the entire food.

[23] The food according to [21] or [22], comprising the powdered fat and/or oil composition in a molten state.

[24] A method for producing a food, comprising blending the powdered fat and/or oil composition according to any one of [1] to [11].

[25] The method for producing a food according to [24], comprising blending 0.1 to 99% by mass of the powdered fat and/or oil composition relative to 100% by mass of the entire food.

[26] A food quality improver comprising the powdered fat and/or oil composition according to any one of [1] to [11] as an active ingredient.

[27] An adhesive comprising the powdered fat and/or oil composition according to any one of [1] to [11].

[28] The adhesive according to [27], comprising 1 to 99% by mass of the powdered fat and/or oil composition relative to 100% by mass of the entire adhesive.

[29] A method for producing an adhesive, comprising blending the powdered fat and/or oil composition according to any one of [1] to [11].

[30] The method for producing an adhesive according to [29], comprising blending 1 to 99% by mass of the powdered fat and/or oil composition relative to 100% by mass of the entire adhesive.

[31] A coating comprising the powdered fat and/or oil composition according to any one of [1] to [11].

[32] The coating according to [31], comprising 1 to 99% by mass of the powdered fat and/or oil composition relative to 100% by mass of the entire coating.

[33] A method for producing a coating, comprising blending the powdered fat and/or oil composition according to anyone of [1] to [11].

[34] The method for producing a coating according to [33], comprising blending 1 to 99% by mass of the powdered fat and/or oil composition relative to 100% by mass of the entire coating.

The present invention makes it possible to provide a powdered fat and/or oil composition containing a fat and/or oil ingredient containing at least one type of a XXX triglyceride having fatty acid residues X, each with x carbon atoms, at positions 1 to 3 of glycerin, the powdered fat and/or oil composition characterized in that x number of carbon atoms is an integer selected from 10 to 22, at least a portion of the fat and/or oil ingredient is a β-form fat and/or oil, particles of the powdered fat and/or oil composition have a plate-like shape, and the powdered fat and/or oil composition has a loose bulk density of 0.05 to 0.6 g/cm³.

The present invention makes it possible to provide a method for producing a powdered fat and/or oil composition containing a fat and/or oil ingredient containing at least one type of a XXX triglyceride having fatty acid residues X, each with x carbon atoms, at positions 1 to 3 of glycerin, characterized in that x number of carbon atoms is an integer selected from 10 to 22, the fat and/or oil ingredient contains a β-form fat and/or oil, particles of the powdered fat and/or oil composition have a plate-like shape, and the powdered fat and/or oil composition has a loose bulk density of 0.05 to 0.6 g/cm³, the method including the following steps of: (a) preparing a fat and/or oil composition raw material containing at least one type of a XXX triglyceride having fatty acid residues X, each with x carbon atoms, at positions 1 to 3 of glycerin; and (d) cooling and solidifying the fat and/or oil composition raw material to obtain a powdered fat and/or oil composition containing a β-form fat and/or oil whose particles have a plate-like shape.

Further, the present invention makes it possible to provide a β-form fat and/or oil containing at least one type of a XXX triglyceride having fatty acid residues X, each with x carbon atoms, at positions 1 to 3 of glycerin, the β-form fat and/or oil characterized in that x number of carbon atoms is an integer selected from 10 to 22, particles of the β-form fat and/or oil have a plate-like shape,
has a diffraction peak at 4.5 to 4.7 Å in an X-ray diffraction measurement.

Furthermore, the present invention makes it possible to provide a food to which a powdered fat and/or oil composition obtained as described above is added. In addition, the present invention makes it possible to provide an adhesive having a sufficient adhesiveness and a coating having a sufficient covering performance.

DESCRIPTION OF EMBODIMENTS

<Powdered Fat and/or Oil Composition>

Figure 1:
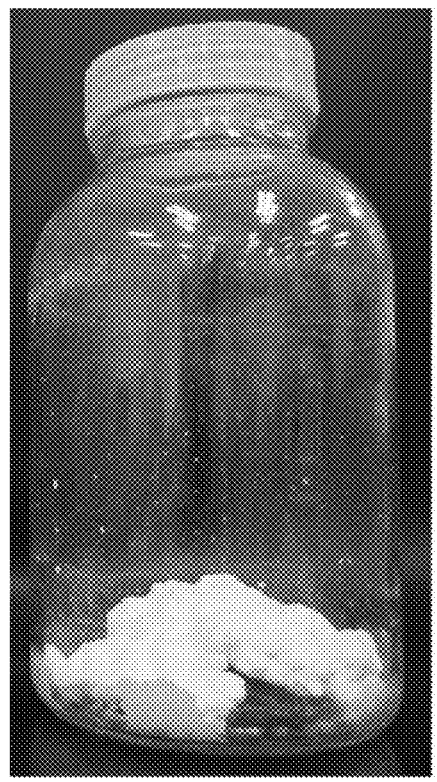
FIG. 1 is a photograph of an appearance of a powdered fat and/or oil composition (β-form fat and/or oil) of Example 7 of the present invention.
Figure 2:
FIG. 2 is a photograph of an appearance of the powdered fat and/or oil composition (β-form fat and/or oil) of Example 7 of the present invention.
Figure 3:
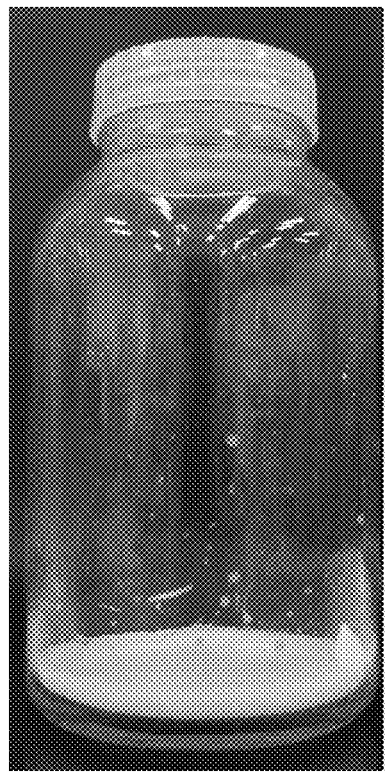
FIG. 3 is a photograph of an appearance of a fat and/or oil composition (α-form fat and/or oil) of Comparative Example 3 of the present invention.

The present invention relates to a powdered fat and/or oil composition containing a fat and/or oil ingredient containing at least one type of a XXX triglyceride having fatty acid residues X, each with x carbon atoms, at positions 1 to of glycerin, the powdered fat and/or oil composition characterized in that x number of carbon atoms is an integer selected from 10 to 22, the fat and/or oil ingredient contains a β-form fat and/or oil, particles of the powdered fat and/or oil composition have a plate-like shape, and the powdered fat and/or oil composition has a loose bulk density of 0.05 to 0.6 g/cm³. Hereinafter, the powdered fat and/or oil composition of the present invention will be described in detail.

<Fat and/or Oil Ingredient>

The powdered fat and/or oil composition of the present invention contains a fat and/or oil ingredient. The fat and/or oil ingredient contains at least a XXX triglyceride, and optionally contains other triglycerides.

The fat and/or oil ingredient contains a β-form fat and/or oil. Herein, a β-form fat and/or oil is a fat and/or oil constituted only of a β-form crystal, which is one of polymorphs of the fat and/or oil. Other polymorphs of a fat and/or oil include a β'-form fat and/or oil and an α-form fat and/or oil. A β'-form fat and/or oil is a fat and/or oil constituted only of a β'-form crystal, which is one of polymorphs of the fat and/or oil. An α-form fat and/or oil is a fat and/or oil constituted only of an α-form crystal, which is one of polymorphs of the fat and/or oil. Some crystals of fats and/or oils have the same composition but have different sub-lattice structures (crystal structures), and are referred to as polymorphs. Polymorphs typically include hexagonal, orthorhombic perpendicular, and triclinic parallel crystals, respectively referred to as α-form, β'-form, and β-form.

Moreover, regarding the melting points of the polymorphs, the melting points increase in the order of α, β', and β. The melting points of polymorphs vary depending on the type of fatty acid residues X each having x carbon atoms. Hence, Table 1 below shows the melting point (° C.) of each polymorph of tricaprin, trilaurin, trimyristin, tripalmitin, tristearin, triarachidin, and tribehenin. Note that Table 1 has been prepared based on Nissim Garti et al., "Crystallization and Polymorphism of Fats and Fatty Acids", Marcel Dekker Inc., 1988, pp. 32-33. Further, in preparing Table 1, each melting point temperature (° C.) is rounded to the nearest whole number. Moreover, if the composition of a fat and/or oil and the melting point of each polymorph are found, at least whether a β-form fat and/or oil exists in the fat and/or oil or not can be detected.

TABLE 1

|  | α-form fat and/or oil (° C.) | β'-form fat and/or oil (° C.) | β-form fat and/or oil (° C.) |
| --- | --- | --- | --- |
| tricaprin | −9 | 16 | 32 |
| trilaurin | 15 | 34 | 47 |
| trimyristin | 33 | 45 | 59 |
| tripalmitin | 45 | 57 | 66 |
| tristearin | 55 | 63 | 74 |
| triarachidin | 62 | 69 | 78 |
| tribehenin | 68 | 74 | 83 |

A general method for identifying these polymorphs includes X-ray diffraction, and the diffraction condition is given according to the following Bragg's equation.

$$2d \sin \theta = n\lambda (n=1,2,3,\ldots)$$

A diffraction peak appears at a position satisfying this equation. Here, d is a lattice constant, θ is a diffraction (incident) angle, λ is a wavelength of X-ray, and n is a natural number. From a diffraction peak at 2θ=16 to 27° corresponding to a short spacing, information on packing (sub-lattice) in the crystal side surface is obtained, and the polymorph can be identified. Particularly, in a case of a triacylglycerol, the β-form characteristic peak appears at 2θ=19, 23, 24° (near 4.6 Å, near 3.9 Å, near 3.8 Å), and the α-form characteristic peak appears near 21° (4.2 Å). Note that, in the X-ray diffraction measurement, for example, an X-ray diffraction system (Rigaku Corporation, a horizontal sample mounting-type X-ray diffraction system Ultima IV) maintained at 20° C. is used to perform the measurement. As the source of X-rays, CuKα radiation (1.54 Å) is most frequently utilized.

Further, the polymorphs of the fats and/or oils can also be predicted by differential scanning calorimetry (DSC method). For example, in the β-form fat and/or oil prediction, the crystal structure of a fat and/or oil is predicted based on a DSC curve obtained by raising the temperature to 100° C. at a rate of temperature rise of 10° C./minute with a differential scanning calorimeter (manufactured by SII NanoTechnology Inc., model: BSC6220).

Herein, the fat and/or oil ingredient contains the β-form fat and/or oil, or should at least contain the β-form fat and/or oil as a main ingredient (exceeding 50% by mass). In a preferable embodiment, the fat and/or oil ingredient is substantially constituted of the β-form fat and/or oil. In a more preferable embodiment, the fat and/or oil ingredient is constituted of the β-form fat and/or oil. In a particularly preferable embodiment, the fat and/or oil ingredient is constituted only of the β-form fat and/or oil. In the case where all the fat and/or oil ingredient is the β-form fat and/or oil, no α-form fat and/or oil and/or β'-form fat and/or oil are detected by differential scanning calorimetry. In another preferable embodiment, the fat and/or oil ingredient (or the powdered fat and/or oil composition containing the fat and/or oil ingredient) has a diffraction peak near 4.5 to 4.7 Å, preferably near 4.6 Å, in an X-ray diffraction measurement, but has no X-ray diffraction peak of the short spacings of the α-form fats and/or oils and/or β'-form fats and/or oils in Table 1, particularly has no diffraction peak near 4.2 Å. In such cases also, it can be determined that all the fat and/or oil ingredient is the β-form fat and/or oil. In a further embodiment of the present invention, all the fat and/or oil ingredient is preferably the β-form fat and/or oil, but may contain other forms such as α-form fat and/or oil or β'-form fat and/or oil. Herein, "containing the β-form fat and/or oil" in the fat and/or oil ingredient of the present invention and an indicator of a relative amount of the β-form fat and/or oil to "the α-form fat and/or oil + the β-form fat and/or oil" can be speculated from intensity proportions of the β-form characteristic peak and the α-form characteristic peak among X-ray diffraction peaks: [β-form characteristic peak intensity/(α-form characteristic peak intensity+β-form characteristic peak intensity)] (hereinafter also referred to as peak intensity ratio). Specifically, based on the finding of the above-described X-ray diffraction measurement, "containing the β-form fat and/or oil" can be understood by calculating proportions of a peak intensity at 2θ=19° (4.6 Å), which is the β-form characteristic peak, and a peak intensity at 2θ=21° (4.2 Å), which is the α-form characteristic peak: 19°/(19°+21°) [4.6 Å/(4.6 Å+4.2 Å)], as the indicator indicating the abundance of the β-form fat and/or oil in the fat and/or oil ingredient. In the present invention, all the fat and/or oil ingredient is preferably the β-form fat and/or oil (i.e., the peak intensity ratio=1). However, it is appropriate to set, for example, the lower limit value of the peak intensity ratio to, for example, 0.4 or more, preferably 0.5 or more, more preferably 0.6 or more, further preferably 0.7 or more, particularly preferably 0.75 or more, and furthermore preferably 0.8 or more. With the peak intensity of 0.4 or more, the β-form fat and/or oil can be regarded as the main ingredient exceeding 50% by mass. The upper limit value of the peak intensity ratio is preferably 1, but may be 0.99 or less, 0.98 or less, 0.95 or less, 0.93 or less, 0.90 or less, 0.85 or less, or 0.80 or less, for example. The peak intensity ratio can be any one of the above-described lower and upper limit values or any combination thereof.

<XXX Triglyceride>

The fat and/or oil ingredient of the present invention contains at least one type of the XXX triglyceride having fatty acid residues X, each with x carbon atoms, at positions 1 to 3 of glycerin. The XXX triglyceride is a triglyceride having fatty acid residues X, each with x carbon atoms, at positions 1 to 3 of glycerin. Each of the fatty acid residues X is the same as the others. Herein, x number of carbon atoms is an integer selected from 10 to 22, preferably an integer selected from 12 to 22, more preferably an integer selected from 14 to 20, and further preferably an integer selected from 16 to 18.

The fatty acid residues X may be saturated or unsaturated fatty acid residues. Specific examples of the fatty acid residues X include residues such as capric acid, lauric acid, myristic acid, palmitic acid, stearic acid, arachidic acid, and behenic acid, but are not limited thereto. The fatty acids are more preferably lauric acid, myristic acid, palmitic acid, stearic acid, arachidic acid, and behenic acid, further preferably myristic acid, palmitic acid, stearic acid, and arachidic acid, and furthermore preferably palmitic acid and stearic acid.

The content range of the XXX triglyceride is as follows. Given that a total mass of the fat and/or oil ingredient is 100% by mass, the lower limit is, for example, 50% by mass or more, preferably 60% by mass or more, more preferably 70% by mass or more, and further preferably 80% by mass or more; meanwhile, the upper limit is, for example, 100% by mass or less, preferably 99% by mass or less, and more preferably 95% by mass or less. One type or at least two types of the XXX triglyceride can be used, preferably one type or two types, and more preferably one type thereof is used. In the case where two or more types of the XXX triglycerides are used, the content is a total value of the XXX triglycerides.

<Other Triglycerides>

The fat and/or oil ingredient of the present invention may contain other triglycerides than the above-described XXX triglyceride, as long as the effects of the present invention are not impaired. The other triglycerides may be multiple types of triglycerides, or may be synthetic fats and/or oils or natural fats and/or oils. The synthetic fats and/or oils include glyceryl tricaprylate, glyceryl tricaprate, and the like. Examples of the natural fats and/or oils include cocoa butter, sunflower seed oil, rapeseed oil, soybean oil, cottonseed oil, and the like. The other triglycerides may be contained in an amount of 1% by mass or more, for example, approximately 5 to 50% by mass relative to 100% by mass of all the triglycerides in the fat and/or oil ingredient of the present invention without problems. The content of the other triglycerides is, for example, 0 to 30% by mass, preferably 0 to 18% by mass, more preferably 0 to 15% by mass, and further preferably 0 to 8% by mass.

<Other Ingredients>

The powdered fat and/or oil composition of the present invention may optionally contain other ingredients (additives), such as an emulsifier, a flavor, a skim milk powder, a whole milk powder, a cocoa powder, sugar, dextrin, a sweetener, and a coloring agent, than the fat and/or oil ingredient such as the triglyceride. These optional ingredients can also be externally added to the powdered fat and/or oil composition of the present invention. However, incorporating the optional ingredients into the powdered fat and/or oil composition in advance enables these optional ingredients to reliably and easily adhere on a food base material. The amount of these other ingredients can be any amount, as long as the effects of the present invention are not impaired. For example, the amount is 0 to 70% by mass, preferably 0 to 65% by mass, and more preferably 0 to 30% by mass, given that a total mass of the powdered fat and/or oil composition is 100% by mass. Preferably, 90% by mass or more of the other ingredients are a powder having an average particle diameter of 1000 μm or less, and more preferably a powder having an average particle diameter of 500 μm or less. Further, since it is difficult for human to sense and perceive particles as fine as 20 μm or less, a powder having an average particle diameter of for example 20 μm or less, preferably 0.1 to 20 μm, and more preferably 1 to 10 μm, is preferable because the coarse, gritty perception of the powder disappears when the powder is put into the mouth. Note that, unless otherwise particularly stated, the term average particle diameter in the present Description is a value measured according to laser diffraction/scattering methods (ISO133201 and ISO9276-1).

However, a preferable powdered fat and/or oil composition of the present invention is preferably substantially constituted only of the fat and/or oil ingredient, and the fat and/or oil ingredient is preferably substantially constituted only of the triglyceride. In addition, the term "substantially" means that the content of an ingredient(s) other than the fat and/or oil ingredient incorporated in the fat and/or oil composition or of an ingredient(s) other than the triglyceride incorporated in the fat and/or oil ingredient is, for example, 0 to 15% by mass, preferably 0 to 10% by mass, and more preferably 0 to 5% by mass, relative to 100% by mass of the powdered fat and/or oil composition or the fat and/or oil ingredient.

<Powdered Fat and/or Oil Composition>

The powdered fat and/or oil composition of the present invention can be obtained by: melting a fat and/or oil composition raw material containing at least one type of a XXX triglyceride having fatty acid residues X, each with x carbon atoms, at positions 1 to 3 of glycerin; and keeping the fat and/or oil composition raw material in the molten state at a specific cooling temperature for the cooling and solidification, so that a fat and/or oil composition in a powder form (powdered fat and/or oil composition) is obtained without adopting special processing means such as spraying and mechanical pulverization with a pulverizer such as a mill. More specifically, the powdered fat and/or oil composition can be obtained through steps of: (a) preparing the fat and/or oil composition raw material containing a XXX triglyceride; optionally, (b) heating the fat and/or oil composition raw material obtained in step (a) to melt the triglyceride incorporated in the fat and/or oil composition raw material, thereby obtaining the fat and/or oil composition raw material in a molten state; and (d) cooling and solidifying the fat and/or oil composition raw material to obtain a powdered fat and/or oil composition containing a β-form fat and/or oil whose particles have a plate-like shape. Note that the powdered fat and/or oil composition can also be produced by subjecting a solid resulting after the cooling to known pulverization means such as a hammer mill or a cutter mill.

In step (d), the fat and/or oil composition raw material in the molten state is cooled, for example, at a temperature which is lower than a melting point of the β-form fat and/or oil of the fat and/or oil ingredient incorporated in the fat and/or oil composition raw material, and which is not lower than a cooling temperature obtained from the following formula: cooling temperature (° C.)=x number of carbon atoms×6.6−68. By cooling within such a temperature range, the β-form fat and/or oil can be efficiently produced, forming fine crystals, so that the powdered fat and/or oil composition can be easily obtained. Note that the term "fine" refers to having primary particles (the smallest crystal) of for example 20 μm or less, preferably 15 μm or less, and more preferably 10 μm or less. Meanwhile, if the cooling is not performed within the temperature range, the β-form fat and/or oil is not formed, a solid having voids with a larger volume than the fat and/or oil composition raw material cannot be formed in some cases (Comparative Examples 1, 3). Further, in the present invention, the cooling within the temperature range forms the β-form fat and/or oil in a still state, and makes particles of the powdered fat and/or oil composition have a plate-like shape. The cooling method is useful for specifying the powdered fat and/or oil composition of the present invention.

<Properties of Powdered Fat and/or Oil Composition>

The powdered fat and/or oil composition of the present invention is a powdered solid at normal temperature (20° C.).

The powdered fat and/or oil composition of the present invention, for example, if substantially constituted only of a fat and/or oil ingredient, has a loose bulk density of 0.05 to 0.6 g/cm$^3$, preferably 0.1 to 0.5 g/cm$^3$, more preferably 0.1 to 0.4 g/cm$^3$ or 0.15 to 0.4 g/cm$^3$, and further preferably 0.2 to 0.3 g/cm$^3$. Herein, a "loose bulk density" refers to a packing density determined by letting a powder naturally fall. A loose bulk density (g/cm$^3$) is measured, for example, by: letting an appropriate amount of a powdered fat and/or oil composition fall approximately 2 cm above an upper opening end of a graduated cylinder with an inner diameter 15 mm×25 mL to loosely fill the graduated cylinder; measuring a mass (g) and reading a volume (mL) thus filled; and calculating a mass (g) of the powdered fat and/or oil composition per mL to determine the loose bulk density. Alternatively, a loose bulk density can also be calculated from a bulk specific gravity measured based on JIS K-6720 (or ISO 1060-1 and 2) by using a bulk specific gravity measuring device manufactured by Kuramochi Kagaku Kikai Seisakusho Co. Specifically, 120 mL of a sample is let fall toward a receiver (a 100-mL cylindrical container with an inner diameter of 40 mm x a height of 85 mm) from a height position 38 mm above an upper opening of the receiver. The sample protruding from the receiver is slid off, and a mass (A g) of the sample corresponding to the internal capacity (100 mL) of the receiver is weighed, so that a loose bulk density can be determined from the following formula:

Loose bulk density($g$/$mL$)=$A$($g$)/100 ($mL$)

The measurement is preferably performed three times to obtain the average.

Moreover, the particles of the powdered fat and/or oil composition of the present invention normally have a plate-like shape and have an average particle diameter (effective diameter) of for example 5 to 200 μm, preferably 10 to 150 μm, more preferably 20 to 120 μm, and furthermore preferably 25 to 100 μm. Herein, the average particle diameter (effective diameter) can be determined based on laser diffraction/scattering methods (ISO133201, ISO9276-1) using a particle size distribution measuring apparatus (for example, Microtrac MT3300ExII manufactured by Nikkiso Co., Ltd.). The term effective diameter means a spherical particle diameter when a measured diffraction pattern of a measurement-target crystal fits to a theoretical diffraction pattern obtained under an assumption that the measurement target is spherical. In this manner, in the laser diffraction/scattering methods, an effective diameter is calculated by fitting a measured diffraction pattern to a theoretical diffraction pattern obtained under the assumption that the measurement target is spherical. For this reason, even when a measurement target has a plate-like shape or a spherical shape, the measurement can be performed according to the same principle. Herein, the plate-like shape preferably has an aspect ratio of 1.1 or more, more preferably an aspect ratio of 1.2 or more, further preferably an aspect ratio of 1.2 to 3.0, particularly preferably 1.3 to 2.5, and furthermore preferably 1.4 to 2.0. Note that the term aspect ratio herein is defined as a ratio of the length of a longer side to the length of a shorter side of a rectangle which is circumscribed about a particle representation in such a manner that the area is minimum. Moreover, in the case where the particles have a spherical shape, the aspect ratio is smaller than 1.1. In a conventional technique, that is, a method in which a fat and/or oil such as a highly hydrogenated oil having a high solid fat content at normal temperature is melted and directly sprayed, the particles of a powdered fat and/or oil composition have a spherical shape due to the surface tension, and the aspect ratio is less than 1.1. Then, for example, arbitrarily selected particles are directly observed with an optical microscope, a scanning electron microscope, or the like, and the lengths in the major-axis and minor-axis directions of the particles are measured, so that the aspect ratio can be determined as the average of the measured particles.

Further, in order to add the powdered fat and/or oil composition of the present invention to a food, specifically, in a case where, for example, an additive adheres to the surface of a food or the like, or the powdered fat and/or oil composition of the present invention is used as an adhesive or a coating by itself, it is appropriate to have an average particle diameter (effective diameter) of for example 0.1 μm or more, preferably 1 μm or more, more preferably 2 μm or more, and further preferably 4 μm or more, and simultaneously for example 20 μm or less, preferably 15 μm or less, more preferably 10 μm or less, and further preferably 5 μm or less. The method for measuring the average particle diameter (effective diameter) is the same as described above. Particularly, the average particle diameter of 20 μm or less is preferable because the coarse, gritty perception of the powder disappears when the powder is put into the mouth.

<Method for Producing Powdered Fat and/or Oil Composition>

The powdered fat and/or oil composition of the present invention can be produced by a method including the following steps of:

(a) preparing a fat and/or oil composition raw material containing a XXX triglyceride;

(b) optionally, for example, heating the fat and/or oil composition raw material obtained in step (a) to melt the triglyceride incorporated in the fat and/or oil composition raw material, thereby obtaining the fat and/or oil composition raw material in a molten state; and (d) cooling and solidifying the fat and/or oil composition raw material to obtain a powdered fat and/or oil composition containing a β-form fat and/or oil whose particles have a plate-like shape.

Additionally, the method may include, as step (c), an optional step(s) for promoting the powder formation, for example, a seeding step (c1), a tempering step (c2), and/or a pre-cooling step (c3), between steps (b) and (d). Further, the powdered fat and/or oil composition obtained in step (d) may be obtained by a step of (e) pulverizing a solid resulting after the cooling in step (d) to obtain a powdered fat and/or oil composition. Hereinafter, steps (a) to (e) will be described.

(a) Step of Preparing Raw Material

The fat and/or oil composition raw material containing a XXX triglyceride prepared in step (a) can be produced based on methods for producing fats and/or oils such as normal XXX triglycerides including at least one type of a XXX triglyceride having fatty acid residues X, each with x carbon atoms, at positions 1 to 3 of glycerin, or easily obtained from the market. Herein, the XXX triglyceride specified by x carbon atoms and fatty acid residues X is the same as the finally-obtained target fat and/or oil ingredient except for the polymorphs. The raw material may contain the β-form fat and/or oil, and may contain the β-form fat and/or oil in an amount of, for example, 0.1% by mass or less, 0.05% by mass or less, or 0.01% by mass or less. However, the β-form fat and/or oil disappears when the raw material is melted by heating or the like, and hence the raw material may be a raw material in a molten state. In the case where the raw material is, for example, in a molten state, substantially containing no β-form fat and/or oil means to include cases where not only the XXX triglyceride but also substantially all the fat and/or oil ingredient is not the β-form fat and/or oil. The presence of the β-form fat and/or oil can be confirmed by checking a diffraction peak derived from the β-form fat and/or oil by the above-described X-ray diffraction measurement, the β-form fat and/or oil by differential scanning calorimetry, and so forth. In the case of "substantially containing no β-form fat and/or oil," the abundance of the β-form fat and/or oil can be speculated from the intensity proportions of the β-form characteristic peak and the α-form characteristic peak among X-ray diffraction peaks: [β-form characteristic peak intensity/(α-form characteristic peak intensity+β-form characteristic peak intensity)](peak intensity ratio). The peak intensity ratio of the fat and/or oil composition raw material is, for example, 0.2 or less, preferably 0.15 or less, and more preferably 0.10 or less. The fat and/or oil composition raw material may contain one type or at least two types, preferably one type or two types, and more preferably one type, of the XXX triglyceride as described above.

Specifically, for example, the XXX triglyceride can be produced through direct synthesis using fatty acids or fatty acid derivatives and glycerin. The method for directly synthesizing the XXX triglyceride includes: (i) a method in which fatty acids each with X carbon atoms and glycerin are directly esterified (direct esterification); (ii) a method in which a fatty acid alkyl ester (for example, fatty acid methyl ester and fatty acid ethyl ester) having an alkoxyl group bonded to a carboxyl group of a fatty acid X with x carbon atoms is reacted with glycerin under a base or acid catalyst condition (transesterification synthesis using a fatty acid alkyl ester); and (iii) a method in which a fatty acid halide (for example, fatty acid chloride and fatty acid bromide) having a halogen substituting for a hydroxyl group of a carboxyl group of a fatty acid X with x carbon atoms is reacted with glycerin under a base catalyst (acid halide synthesis).

The XXX triglyceride can be produced by any of the above-described methods (i) to (iii). However, from the viewpoint of the ease of the production, direct esterification (i) or the transesterification synthesis (ii) using a fatty acid alkyl ester is preferable, and the direct esterification (i) is more preferable.

To produce the XXX triglyceride by the direct esterification (i), preferably 3 to 5 moles, more preferably 3 to 4 moles, of the fatty acid X or fatty acid Y is used relative to 1 mole of glycerin from the viewpoint of the production efficiency.

The reaction temperature in the direct esterification (i) for the XXX triglyceride should be a temperature at which water formed by the esterification can be removed to the outside of the system. For example, the reaction temperature is preferably 120° C. to 300° C., more preferably 150° C. to 270° C., and further preferably 180° C. to 250° C. When the reaction is carried out at 180 to 250° C., the XXX triglyceride can be produced particularly efficiently.

In the direct esterification (i) for the XXX triglyceride, a catalyst may be used to promote the esterification. The catalyst includes acid catalysts, alkaline earth metal alkoxides, and the like. The amount of the catalyst used is preferably approximately 0.001 to 1% by mass relative to a total mass of the reaction raw materials.

In the direct esterification (i) for the XXX triglyceride, the catalyst and unreacted raw materials can be removed by a known purification treatment such as water washing, alkaline neutralization (deacidification), and/or deacidification under reduced pressure, and adsorption treatment, after the reaction. Further, the obtained product can be further purified by decolorization and deodorization treatments.

The amount of the XXX triglyceride incorporated in the fat and/or oil composition raw material is, for example, 100 to 50% by mass, preferably 95 to 55% by mass, and more preferably 90 to 60% by mass, given that a total mass of all the triglycerides incorporated in the raw material is 100% by mass. Further, the amount is furthermore preferably 85 to 65% by mass.

<Other Triglycerides>

As other triglycerides constituting the fat and/or oil composition raw material containing a XXX triglyceride, various triglycerides may be incorporated in addition to the XXX triglyceride, as long as the effects of the present invention are not impaired. Examples of the other triglycerides include: X2Y triglycerides each having a fatty acid residue Y in place of one of the fatty acid residues X of the XXX triglyceride; XY2 triglycerides each having fatty acid residues Y in place of two of the fatty acid residues X of the XXX triglyceride; and the like.

The amount of the other triglycerides is, for example, 0 to 100% by mass, preferably 0 to 70% by mass, and more preferably 1 to 40% by mass, given that a total mass of the XXX triglycerides is 100% by mass.

Moreover, as the fat and/or oil composition raw material of the present invention, naturally-derived triglyceride compositions having been subjected to hydrogenation, interesterification, or fractionation may be used instead of directly synthesizing the XXX triglyceride. Examples of the naturally-derived triglyceride compositions include rapeseed oil, soybean oil, sunflower seed oil, high oleic sunflower seed oil, safflower oil, palm stearin, mixtures thereof, and the like. Particularly, preferable examples include hydrogenated oils, partially hydrogenated oils, and highly hydrogenated oils of these naturally-derived triglyceride compositions. Further preferable examples include hard palm stearin, high oleic sunflower seed oil, highly hydrogenated oil, highly hydrogenated rapeseed oil, and highly hydrogenated soybean oil.

Further, the fat and/or oil composition raw material of the present invention includes commercially-available triglyceride compositions or synthetic fats and/or oils. Examples of the triglyceride compositions include hard palm stearin (manufactured by The Nisshin OilliO Group, Ltd.), highly hydrogenated rapeseed oil (manufactured by Yokozeki Oil & Fat Industries Co.), and highly hydrogenated soybean oil (manufactured by Yokozeki Oil & Fat Industries Co.). Moreover, the synthetic fats and/or oils include tripalmitin (manufactured by Tokyo Chemical Industry Co., Ltd.), tristearin (manufactured by Sigma-Aldrich Corporation), tristearin (manufactured by Tokyo Chemical Industry Co., Ltd.), triarachidin (manufactured by Tokyo Chemical Industry Co., Ltd.), and tribehenin (manufactured by Tokyo Chemical Industry Co., Ltd.). Besides, since highly hydrogenated palm oil has a low XXX-triglyceride content, highly hydrogenated palm oil can be used as an ingredient for diluting the triglyceride.

<Other Ingredients>

The fat and/or oil composition raw material may optionally contain other ingredients such as a partial glyceride, a fatty acid, an antioxidant, an emulsifier, and a solvent such as water, in addition to the above-described triglyceride. The amount of these other ingredients coil-containing. For example, the amount is 0 to 5% by mass, preferably 0 to 2% by mass, and more preferably 0 to 1% by mass, given that the total mass of the XXX triglycerides is 100% by mass.

In a case where the fat and/or oil composition raw material contains multiple ingredients, these may be mixed optionally. The mixing may be performed by adopting any known mixing method, as long as a uniform reaction substrate is obtained. For example, the mixing can be performed with a paddle mixer, an agi-homo mixer, a disper mixer, or the like.

The mixing may be performed under heating as necessary. The heating is preferably performed at a heating temperature comparable to that in step (b) to be described below. For example, the heating is performed at 50 to 120° C., preferably 60 to 100° C., more preferably 70 to 90° C., and further preferably 80° C.

(b) Step of Obtaining the Fat and/or Oil Composition in Molten State

Before step (d), if the fat and/or oil composition raw material prepared in step (a) is in a molten state when prepared, the fat and/or oil composition raw material is directly cooled without heating. Meanwhile, if the fat and/or oil composition raw material is not in a molten state when prepared, the fat and/or oil composition raw material is optionally heated to melt the triglyceride incorporated in the fat and/or oil composition raw material, so that the fat and/or oil composition raw material in the molten state is obtained.

Herein, it is appropriate to heat the fat and/or oil composition raw material at a temperature not lower than a melting point of the triglyceride incorporated in the fat and/or oil composition raw material, particularly at a temperature at which the XXX triglyceride can be melted, for example, 70 to 200° C., preferably 75 to 150° C., and more preferably 80 to 100° C. Moreover, it is appropriate to continue the heating for, for example, 0.1 to 3 hours, preferably 0.3 to 2 hours, and more preferably 0.5 to 1 hour.

(d) Step of Cooling Fat and/or Oil Composition in Molten State to Obtain Powdered Fat and/or Oil Composition The fat and/or oil composition raw material in the molten state prepared in step (a) or (b) is further cooled and solidified to form a powdered fat and/or oil composition containing a β-form fat and/or oil whose particles have a plate-like shape.

Herein, in order to "cool and solidify the fat and/or oil composition raw material in the molten state," it is necessary to keep the fat and/or oil composition raw material in the molten state at a temperature, as the upper limit value of the cooling temperature, which is lower than the melting point of the β-form fat and/or oil of the fat and/or oil ingredient incorporated in the fat and/or oil composition raw material. In a case where the XXX triglyceride has three stearic acid residues each having 18 carbon atoms, the melting point of the β-form fat and/or oil is 74° C. (Table 1). Hence, in this case, the "temperature lower than the melting point of the β-form fat and/or oil of the fat and/or oil ingredient incorporated in the fat and/or oil composition raw material" is, for example, a temperature lower by 1 to 30° C. than the melting point (i.e., 44 to 73° C.), preferably a temperature lower by 1 to 20° C. than the melting point (i.e., 54 to 73° C.), more preferably a temperature lower by 1 to 15° C. than the melting point (i.e., 59 to 73° C.), and particularly preferably a temperature lower by 1° C., 2° C., 3° C., 4° C., 5° C., 6° C., 7° C., 8° C., 9° C., or 10° C.

More preferably, in order to obtain the β-form fat and/or oil, it is appropriate to keep the fat and/or oil composition raw material in the molten state at no lower than the cooling temperature obtained from the following formula as the lower limit value of the cooling temperature:

cooling temperature(° C.)=x number of carbon atoms×6.6−68.

(in the formula, the x number of carbon atoms is x number of carbon atoms of the XXX triglyceride incorporated in the fat and/or oil composition raw material)

The temperature is kept at no lower than the cooling temperature as described above because, in order to obtain the β-form fat and/or oil containing the XXX triglyceride, when the fat and/or oil is crystallized, the cooling temperature needs to be set to a temperature at which α-form fat and/or oil and β'-form fat and/or oil other than the β-form fat and/or oil are not crystallized. Since the cooling temperature depends mainly on the size of the XXX triglyceride molecules, it can be understood that there is a certain correlation between the x number of carbon atoms and the optimal lower limit value of the cooling temperature.

For example, in the case where the XXX triglyceride incorporated in the fat and/or oil composition raw material is a XXX triglyceride having three stearic acid residues each having 18 carbon atoms, the lower limit value of the cooling temperature is 50.8° C. or more. Thus, in the case where the XXX triglyceride has three stearic acid residues each having 18 carbon atoms, the temperature of "cooling and solidifying the fat and/or oil composition raw material in the molten state" is more preferably 50.8° C. or more to 72° C. or less.

Meanwhile, in a case where the XXX triglyceride is a mixture of two or more types, the lower limit value can be determined in accordance with the cooling temperature of the type having smaller x number of carbon atoms. For example, in a case where the XXX triglyceride incorporated in the fat and/or oil composition raw material is a mixture of a XXX triglyceride having three palmitic acid residues each having 16 carbon atoms and a XXX triglyceride having three stearic acid residues each having 18 carbon atoms, the lower limit value of the cooling temperature is 37.6° C. or more in accordance with that of smaller number of carbon atoms, that is, 16.

In another embodiment, the lower limit value of the cooling temperature is appropriately a temperature not lower than a melting point of the α-form fat and/or oil corresponding to the β-form fat and/or oil in the fat and/or oil composition raw material containing the XXX triglyceride. For example, in the case where the XXX triglyceride incorporated in the fat and/or oil composition raw material is a XXX triglyceride having three stearic acid residues each having 18 carbon atoms, the melting point of the α-form fat and/or oil of the XXX triglyceride having three stearic acid residues is 55° C. (Table 1). Hence, in this case, the temperature of "cooling and solidifying the fat and/or oil composition raw material in the molten state" is preferably 55° C. or more to 72° C. or less.

In still another embodiment, the fat and/or oil composition raw material in the molten state is cooled such that, for example, when x is 10 to 12, the cooling makes the final temperature reach a temperature of preferably −2 to 46° C., more preferably 12 to 44° C., and further preferably 14 to 42° C. The final temperature in the cooling is, for example, when x is 13 or 14, preferably 24 to 56° C., more preferably 32 to 54° C., and further preferably 40 to 52° C.; when x is 15 or 16, preferably 36 to 66° C., more preferably 44 to 64° C., and further preferably 52 to 62° C.; when x is 17 or 18, preferably 50 to 72° C., more preferably 54 to 70° C., and further preferably 58 to 68° C.; when x is 19 or 20, preferably 62 to 80° C., more preferably 66 to 78° C., and further preferably 70 to 77° C.; when x is 21 or 22, preferably 66 to 84° C., more preferably 70 to 82° C., and further preferably 74 to 80° C. At the final temperature, it is appropriate to leave standing the fat and/or oil composition raw material for, for example, preferably 2 hours or more, more preferably 4 hours or more, and further preferably 6 hours or more, but preferably 2 days or less, more preferably 24 hours or less, and further preferably 12 hours or less.

(c) Step of Promoting Powder Formation

Further, as the optional step (c) for promoting the powder formation between steps (a) or (b) and (d), the fat and/or oil composition raw material in the molten state to be used in step (d) may be treated by a seeding process (c1), a tempering process (c2), and/or a pre-cooling process (c3), before step (d). Any one of these optional steps (c1) to (c3) may be performed alone or in some combinations of the multiple steps. Herein, between step (a) or (b) and step (d) and similar phrases mean to include: during step (a) or (b); after step (a) or (b) but before step (d); and during step (d).

The seeding process (c1) and the tempering process (c2) in the production of the powdered fat and/or oil composition of the present invention are powder-formation promoting methods for processing the fat and/or oil composition raw material in the molten state before the cooling to the final temperature so that the fat and/or oil composition raw material in the molten state can be powdered more reliably.

Herein, the seeding process (c1) is a method for promoting powdering by adding a small amount of an ingredient, which serves as a powder core (seed), during the cooling of the fat and/or oil composition raw material in the molten state. Specifically, for example, targeting the fat and/or oil composition raw material in the molten state obtained in step (b), a fat and/or oil powder containing preferably 80% by mass or more, more preferably 90% by mass or more, of a XXX triglyceride with the same number of carbon atoms as the XXX triglyceride in the fat and/or oil composition raw material is prepared as the ingredient which serves as the core (seed). This fat and/or oil powder serving as the core is added in an amount of 0.1 to 1 part by mass, preferably 0.2 to 0.8 parts by mass, to 100 parts by mass of the fat and/or oil composition raw material in the molten state when the temperature of the fat and/or oil composition raw material reaches a temperature of, for example, the final cooling temperature ±0 to +10° C., preferably +5 to +10° C., during the cooling of the fat and/or oil composition raw material in the molten state. In this manner, this method promotes powdering of the fat and/or oil composition.

Moreover, the tempering process (c2) is a method for promoting powdering of the fat and/or oil composition by one-time cooling before the fat and/or oil composition raw material in the molten state is left standing at the final cooling temperature in cooling the fat and/or oil composition raw material in the molten state. In this process, the fat and/or oil composition raw material in the molten state is cooled to a temperature lower than the cooling temperature in step (d), for example, a temperature lower by 5 to 20° C., preferably a temperature lower by 7 to 15° C., and more preferably a temperature lower by approximately 10° C., for preferably 10 to 120 minutes, more preferably approximately 30 to 90 minutes.

Further, the pre-cooling process (c3) is a method for temporarily cooling, before the cooling in step (d), the fat and/or oil composition raw material in the molten state obtained in step (a) or (b) at a temperature between the temperature in preparing the fat and/or oil composition raw material containing the XXX triglyceride and the cooling temperature in cooling the fat and/or oil composition raw material; in other words, a method for temporarily pre-cooling at a temperature which is lower than the temperature in the molten state in step (a) or (b), but which is higher than the cooling temperature in step (d). After the pre-cooling process (c3), the cooling in step (d) is performed at the cooling temperature in cooling the fat and/or oil composition raw material. The temperature higher than the cooling temperature in step (d) may be, for example, a temperature higher by 2 to 40° C. than the cooling temperature in step (d), preferably a temperature higher by 3 to 30° C., more preferably a temperature higher by 4 to 30° C., and further preferably a temperature higher by approximately 5 to 10° C. Setting a lower temperature for the pre-cooling makes it possible to further shorten the cooling time at the cooling temperature in step (d). Thus, unlike the seeding process and the tempering process, the pre-cooling process is a method for allowing the promotion of powdering of the fat and/or oil composition only by decreasing the cooling temperature stepwise, and has a great advantage in industrial production.

(e) Step of Pulverizing Solid to Obtain Powdered Fat and/or Oil Composition

Step (d) of obtaining the powdered fat and/or oil composition by cooling may be performed more specifically by step (e) of pulverizing a solid resulting from the cooling in step (d) to obtain a powdered fat and/or oil composition.

The detail will be described. First, the fat and/or oil composition raw material is melted to obtain a fat and/or oil composition in a molten state, which is then cooled to form a solid having voids with a larger volume than the fat and/or oil composition raw material in the molten state. The fat and/or oil composition in the form of solid having voids can be pulverized by adding a light impact, so that the solid easily collapses into a powder form.

Herein, the means for adding a light impact is not particularly specified. For example, a pulverization (loosening) method by gently vibrating (applying an impact to) the solid by shaking, sieving, or the like, is simple and preferable.

Note that the solid may be pulverized with known pulverization means. Examples of such pulverization means include a hammer mill, a cutter mill, and the like.

<Usage of Powdered Fat and/or Oil Composition>

The powdered fat and/or oil composition of the present invention can be utilized in various fields using powder fats and/or oils as raw materials. Particularly, the powdered fat and/or oil composition of the present invention can be utilized in the field of foods such as cake mixes, coffee creams, shortenings, and chocolates. Moreover, the powdered fat and/or oil composition of the present invention can be utilized not only in the field of foods but also widely as a coating and an adhesive for adhesion of a food or the like.

<Food Containing Fat and/or Oil Composition>

The powdered fat and/or oil composition of the present invention can be incorporated in various foods. Food raw materials to which the powdered fat and/or oil composition is added include cakes such as cake mixes as described above, coffee creams, shortenings, chocolates, breads, paste products of seafood, baked confectionery products, creams, and the like. The content of the powdered fat and/or oil composition in the food of the present invention varies depending on the type of a target food. For example, the content is 0.1 to 99% by mass, preferably 1 to 90% by mass, more preferably 5 to 85% by mass, and further preferably 10 to 80% by mass, relative to, for example, 100% by mass of the finally obtained food as a whole.

Incorporating the powdered fat and/or oil composition of the present invention as a portion of a raw material of a chocolate improves the solidification speed of the chocolate and enhances the mold-separation speed, making it possible to improve the chocolate with a higher heat resistance. The details will be described later.

<Method for Producing Food Containing Powdered Fat and/or Oil Composition>

The present invention also relates to a method for producing a food containing the above-described powdered fat and/or oil composition.

Specifically, the method can include the above-described step of (d) cooling and solidifying the fat and/or oil composition raw material in a molten state to obtain a powdered fat and/or oil composition containing a β-form fat and/or oil whose particles have a plate-like shape, or (e) pulverizing a solid to obtain a powdered fat and/or oil composition, followed by a step of adding the obtained powdered fat and/or oil composition to a food raw material, that is, (f) adding the obtained powdered fat and/or oil composition to a food raw material to obtain a food containing the powdered fat and/or oil composition.

In step (f), the adding method is not particularly limited. The powdered fat and/or oil composition is added to, for example, a chocolate during the mixing step. In this event, from the viewpoint of the ease of the mixing, the powdered fat and/or oil composition is once melted and then added. However, the fat and/or oil composition may be added in the powder form in some cases. Once melted, the fat and/or oil composition is heated to the melting point or higher and completely melted for use. The mixing is performed preferably for a period during which the powdered fat and/or oil composition is made sufficiently uniform in the food.

In the case where the powdered fat and/or oil composition is used as, for example, an adhesive or a coating, step (f) includes a method in which the obtained powdered fat and/or oil composition is added to the food raw material (the adding includes, for example, not only applying the composition to or coating the food surface therewith, but also incorporating the composition into the food thoroughly).

Hereinafter, description will be given sequentially, by taking particularly a chocolate as an example among the above-described foods.

<Chocolate>

In the present invention, a "chocolate" is not limited to those specified in "Fair Competition Code concerning Labeling for Chocolates (Japan Fair Trade Commission Notification No. 16 of S46.3.29 (Mar. 29, 1971), amended Notification No. 18 of H2.6.22 (Jun. 22, 1990))" (Japan Chocolate Industry Fair Trade Conference) or in regulations, and is not particularly limited, as long as it is produced by adding, as necessary, a dairy product, a flavor, an emulsifier, or the like to main raw materials including cacao mass, a cocoa powder, edible fat and/or oil (such as cocoa butter, vegetable fat and/or oil) and a saccharide (such as sugar, lactose, maltose, fructose), and through chocolate production steps (such as a mixing step, a refining step, a conching step, a cooling step). The "chocolate" of the present invention includes a white chocolate, a color chocolate, and the like which use no cacao mass, in addition to a dark chocolate, a black chocolate, and a milk chocolate. In the present invention, particularly preferable is a chocolate using a hard butter.

Note that, in the present invention, the term "improved chocolate" refers to a chocolate as defined above and containing the above-defined "powdered fat and/or oil composition" or "fat and/or oil composition," the chocolate having an improved solidification speed, an enhanced mold-separation speed, and an increased heat resistance in comparison with chocolates containing no such "powdered fat and/or oil composition" or "fat and/or oil composition."

<Hard Butter>

In the present invention, the term "hard butter" is a generic term of cocoa butter substitutes used as fats and/or oils of chocolates. "Hard butters" are generally classified into tempering type and non-tempering type. A tempering type hard butter mainly contains a symmetrical triglyceride which is incorporated in cacao butter in a large amount. For example, a tempering type hard butter contains SOS triglyceride (hereinafter also referred to as SOS) having oleic acid bonded at position 2 and saturated fatty acids, each with 16 or more carbon atoms, bonded at positions 1, 3. Hence, a tempering type hard butter has a high compatibility with cacao butter. Meanwhile, a tempering type hard butter needs to be subjected to tempering as in cacao butter.

On the other hand, a non-tempering type hard butter has melting properties similar to those of cacao butter, but the fat and/or oil structures are very different from each other. Hence, a non-tempering type hard butter has a low compatibility with cacao butter. However, since tempering is unnecessary and the workability is excellent, non-tempering type hard butters are widely used in the field of chocolates. Moreover, non-tempering type hard butters are roughly divided into lauric acid type and non-lauric acid type. A lauric acid type hard butter has lauric acid as a main constituent fatty acid, and typically contains a hydrogenated and highly hardened high melting-point portion (palm kernel stearin) obtained by fractionating palm kernel oil. This type of hard butter has a characteristic of quick melting, but the compatibility with cacao butter is extremely poor. Hence, the blending ratio of cacao butter has to be as low as possible, so that the product lacks cacao flavor. Meanwhile, a non-lauric acid type hard butter is also called a trans acid type hard butter, but typically includes isomerized and hydrogenated liquid oil such as low melting-point palm olein or soybean oil, and contains a high melting-point portion or intermediate melting-point portion fractionated from such isomerized and hydrogenated products. As the melting properties of this type of hard butter, the characteristic of quick melting is slightly poorer than that of lauric acid type. Meanwhile, the compatibility with cacao butter is better than that of lauric acid type, so that cacao butter can be blended in a large amount in comparison with lauric acid type. However, since non-lauric acid type hard butters contain large amounts of trans fatty acids, the use is avoided since the adverse influence of trans fatty acids on health is recognized. From such background, reductions in trans fatty acids are demanded in non-lauric acid type hard butters.

Note that, in the present invention, the term "improved hard butter" refers to a "hard butter" as defined above and containing the above-defined "powdered fat and/or oil composition" or "fat and/or oil composition," the improved hard butter enabling, when used, the production of a chocolate having an improved solidification speed, an enhanced mold-separation speed, and an increased heat resistance in comparison with hard butters containing no such "powdered fat and/or oil composition" or "fat and/or oil composition."

<Solidification Speed>

In the present invention, a "solidification speed" can be determined from a curve of a solid fat content (SFC) of a fat and/or oil. For example, a fat and/or oil is determined to have a high solidification speed if the solid fat content (SFC) is high 15 minutes after the fat and/or oil is cooled at 20° C. Note that the SFC of a fat and/or oil can be measured using well-known SFC measuring systems. An example thereof includes an SFC measuring system (product name: Minispec MQ-20, manufactured by Bruker Optics K. K.). Examples of the measurement method include: a method in which a fat and/or oil in a molten state heated at 45° C. is put in an SFC measuring system and measured for the SFC every 5 minutes while cooled at 20° C.; and other similar methods.

<Mold-Separation Speed>

In the present invention, a "mold-separation speed" can be determined based on a cooling time after the chocolate starts separating from a mold until the mold-release percentage reaches 90%. Specifically, first, a melted chocolate mix is poured into a mold for molding (for example, a transparent polycarbomate-made mold having a size of 167 mm×84 mm×11 mm and whose upper surface is 167 mm×84 mm and open), and the number of chocolates separated from the mold for molding is visually counted at certain time intervals after cooling is started (for example, with the transparent polycarbomate-made mold used, chocolates appear to rise when released). Suppose a case where chocolates start separating within a shorter cooling time and the mold-release percentage reaches 90% within a shorter cooling time. In this case, the "mold-separation speed" is high in the present invention. The reason why the end point of the "mold-separation speed" is the mold-release percentage of 90% is that it is difficult for all the chocolates to separate from the mold, and that the mold-release percentage based on 100% is likely to cause a variation in the measurement. In addition, the mold-release percentage serves as the indicator of the releasability and the productivity of a chocolate. If a time until the mold-release percentage reaches 90% or more as measured using the transparent polycarbomate-made mold of 167 mm×84 mm×11 mm is 20 minutes or less, it is determined that the chocolate has a favorable releasability (mold separation) and an excellent productivity. Note that the mold-release percentage can be determined according to the following equation.

Mold-release percentage (%)=the number of grids from which chocolates are released/total number of grids×100

<Heat Resistance>

In the present invention, a "heat resistance" can be evaluated from a curve of a solid fat content (SFC) of a fat and/or oil. The evaluation is made as follows: the higher the temperature immediately before a chocolate is completely melted, for example, a temperature at which the SFC is 10%, the more the heat resistance is increased. Note that the SFC of a fat and/or oil can be measured using well-known SFC measuring systems. An example thereof includes an SFC measuring system (product name: Minispec MQ-20, manufactured by Bruker Optics K. K.). Examples of the measurement method include: a method in which a fat and/or oil solidified at 10° C. is put in an SFC measuring system, measured for the SFCs at 20° C. and 25° C. by increasing the temperature, and then further measured for the SFC every time the temperature is increased by 2.5° C.; and other similar methods.

Further, an example of a preferable average particle diameter of the powdered fat and/or oil composition used to produce the improved chocolate of the present invention includes an average particle diameter of 20 μm or less. The method for measuring the average particle diameter is as described above. Since it is difficult for human to sense and perceive particles as fine as 20 μm or less, the use of particles of 20 μm or less makes it possible to add a powdered fat and/or oil composition having a high melting point to a chocolate without imparting a gritty mouthfeel. Further, even when a powdered fat and/or oil composition having a high melting point is added to a chocolate, the use of particles of 20 μm or less does not influence the occurrence of a fat bloom phenomenon (which refers to a phenomenon in which cocoa butter incorporated in a chocolate melts toward the product surface due to an increase in the temperature and emerges in the form of white crystals. Hereinafter, simply referred to as "bloom"). These are great advantages when the powdered fat and/or oil composition of the present invention is used in chocolates.

<Content of Powdered Fat and/or Oil Composition in Food>

First, the content of the powdered fat and/or oil composition in the food of the present invention varies depending on the type of a target food. For example, the content is 1 to 10% by mass relative to 100% by mass of the oil content in the food. The content is more preferably 1 to 8% by mass, and further preferably 1 to 5% by mass. In the case where the target food is a chocolate, the chocolate can contain the powdered fat and/or oil composition in an amount based on the oil content in the chocolate to obtain the improved chocolate of the present invention. Specifically, the improved chocolate contains the powdered fat and/or oil composition in an amount of 1 to 10% by mass relative to 100% by mass of the oil content in the chocolate. The amount is more preferably 1 to 8% by mass, and further preferably 1 to 5% by mass. Meanwhile, in the case where the target food is a hard butter, the powdered fat and/or oil composition is incorporated in an amount of 1 to 10% by mass relative to 100% by mass of the hard butter (all of which corresponds to the oil content). The amount is more preferably 1 to 8% by mass, and further preferably 1 to 5% by mass.

For example, if the numerical range specified above is converted to the amount of the powdered fat and/or oil composition present in the finally-obtained improved chocolate, when 1% by mass of the powdered fat and/or oil composition is incorporated relative to 40% by mass of the oil content in the chocolate, the finally-obtained chocolate contains 0.398% by mass of the powdered fat and/or oil composition (Example 22). Moreover, when 5% by mass of the powdered fat and/or oil composition is incorporated relative to 40% by mass of the oil content in the chocolate, the finally-obtained chocolate contains 1.96% by mass of the powdered fat and/or oil composition (Example 23).

By incorporating at least 1% by mass or more of the powdered fat and/or oil composition of the present invention relative to the improved hard butter or the oil content of the improved chocolate, desired effects of the present invention are obtained. Meanwhile, 10% by mass or less of the powdered fat and/or oil composition is preferably incorporated relative to 100% by mass of the oil content in the chocolate because no adverse influence is exerted on the physical properties, mouthfeel, and so forth. Note that since the powdered fat and/or oil composition may be melted by heat in the chocolate production process, it is also possible to incorporate, in place of the powdered fat and/or oil composition, the fat and/or oil composition in a molten state. The content of this fat and/or oil composition is the same as defined for the powdered fat and/or oil composition.

Herein, the oil content incorporated in the improved chocolate of the present invention includes the hard butter defined above, and also oil contents derived from oil-containing raw materials (such as cacao mass, a cocoa powder, a whole milk powder) of the chocolate, other than an edible fat and/or oil to be defined in the following paragraph. For example, generally, 55% by mass of cacao mass is cocoa butter (oil content), 11% by mass in a cocoa powder is cocoa butter (oil content), and 25% by mass of a whole milk powder is milk fat (oil content). Thus, in the present invention, the "oil content" incorporated in the improved chocolate may be a total value of the hard butter, the edible fat and/or oil, and the oil contents derived from the oil-containing raw materials of the chocolate. Note that since the oil content in the improved chocolate serves as the basis of the content of the powdered fat and/or oil composition, the "oil content" in the improved chocolate in the present invention does not include the powdered fat and/or oil composition of the present invention.

<Edible Fat and/or Oil Incorporated in Improved Chocolate>

The improved chocolate of the present invention can optionally contain an edible fat and/or oil. Such an edible fat and/or oil include edible oils, margarines, fat spreads, shortenings, and the like. One or a combination of at least two of these can be used. As raw materials of the edible fats and/or oils, it is possible to use, for example, coconut oil, palm kernel oil, palm oil, palm fractionated oil (such as palm olein, palm super olein), shea butter, fractionated shea oil, sal fat, fractionated sal oil, illipe butter, soybean oil, rapeseed oil, cottonseed oil, safflower oil, sunflower seed oil, rice oil, corn oil, sesame oil, olive oil, milk fat, cocoa butter, or the like, a fat and/or oil mixture thereof, a processed fat and/or oil thereof, or the like. The amount of these edible fats and/or oils can be any amount, as long as the effects of the present invention are not impaired. For example, the amount is 0 to 100% by mass, preferably 0 to 75% by mass, and more preferably 0 to 50% by mass, relative to 100% by mass of a total mass of the oil contents derived from the oil-containing raw materials of the chocolate.

<Saccharide Incorporated in Improved Chocolate>

The improved chocolate of the present invention preferably contains a saccharide. As the saccharide, it is possible to use, for example, sucrose (sugar, powdered sugar), lactose, glucose, fructose, maltose, a hydrogenated starch saccharide, liquid sugar, enzyme-inverted syrup, isomerized liquid sugar, sucrose-coupled syrup, reducing sugar polydextrose, an oligosaccharide, sorbitol, reduced lactose, trehalose, xylose, xylitose, maltitol, erythritol, mannitol, raffinose, dextrin, or the like. The content of the saccharide incorporated in the improved chocolate of the present invention is preferably 20 to 60% by mass, more preferably 25 to 55% by mass, and further preferably 30 to 50% by mass, given that a total mass of the chocolate is 100% by mass.

<Other Ingredients Incorporated in Improved Chocolate>

In the improved chocolate of the present invention, raw materials, which are generally blended in producing chocolates, can be used other than the fat and/or oil and the saccharide. Specifically, it is possible to use, for example, a dairy product such as a whole milk powder or a skim milk powder, a cacao ingredient such as cacao mass or a cocoa powder, a soybean powder, a soybean protein, a processed fruit product, a processed vegetable product, various powders such as a matcha powder or a coffee powder, a gum, a starch, an antioxidant, a coloring agent, a flavor, an emulsifier, or the like.

Preferable embodiments of the "edible fat and/or oil," the "saccharide," and the "other ingredients" incorporated in the improved chocolate are applicable also to the food of the present invention.

<Method for Producing Food>

The food of the present invention can be produced by conventionally known methods. For example, by taking the improved chocolate of the present invention as an example, the improved chocolate can be produced, for example, by temporarily melting the powdered fat and/or oil composition and adding the resulting fat and/or oil composition in a molten state, or directly adding the powdered fat and/or oil composition, as a portion of raw materials, such as a fat and/or oil (including hard butter), a cacao ingredient, a saccharide, a dairy product, and an emulsifier, to the raw materials such that the final fat and/or oil content in the chocolate is 25 to 65% by mass, and through a mixing step, a refining step (refining), a conching step (conching), a cooling step, and so forth. For example, the chocolate raw materials are mixed (mixing step), refined (refining step) by rolling, then couched (conching step), put into a mold, and cooled and solidified (cooling step), so that the chocolate can be produced. Note that, in the method for producing the improved chocolate of the present invention, whether to perform the tempering or not depends on the type of the hard butter used.

<Food Quality Improver>

Meanwhile, as described above, adding the powdered fat and/or oil composition used in the present invention as a portion of the chocolate raw materials improves conventional chocolates by improving the solidification speed, enhancing the mold-separation speed, and increasing the heat resistance thereof. Accordingly, the present invention also relates to a food (particularly, chocolate) quality improver containing the powdered fat and/or oil composition as an active ingredient. As described below, blending the food quality improver of the present invention into conventional chocolate raw materials makes it possible to achieve the effects of improving qualities such that the chocolate is altered to have an improved solidification speed, an enhanced mold-separation speed, and an increased heat resistance.

The food quality improver of the present invention contains the above-described powdered fat and/or oil composition. Since even a small amount of the food quality improver of the present invention exhibits the effects, the content of the powdered fat and/or oil composition is preferably 60% by mass or more, more preferably 80% by mass or more, and further preferably 100% by mass or more.

Moreover, the food quality improver of the present invention should at least contain the powdered fat and/or oil composition described as the active ingredient, and may further contain other ingredients, including a fat and/or oil such as soybean oil or rapeseed oil, an excipient such as dextrin or starch, and a quality improver, in such ranges that the effects of the present invention are not impaired.

However, a preferable food quality improver of the present invention is preferably substantially constituted only of the powdered fat and/or oil composition. In addition, the term "substantially" means that the content of the ingredients other than the powdered fat and/or oil composition incorporated in the food quality improver is, for example, 0 to 15% by mass, preferably 0 to 10% by mass, and more preferably 0 to 5% by mass, relative to 100% by mass of the food quality improver.

Hereinafter, description will be given of the usage of the powdered fat and/or oil composition of the present invention by taking an adhesive and a coating as examples.

The powdered fat and/or oil composition of the present invention can be used as an adhesive for adhesion of foods, feeds, pharmaceuticals, cosmetics, or the like to each other by taking the advantage of the adhesiveness. The powdered fat and/or oil composition of the present invention can be used to produce, for example, foods, which are assembled like a plastic model for fun, by pasting confections such as biscuits or cookies, and foods exhibiting colors or three-dimensional objects by combining various foods. Moreover, the powdered fat and/or oil composition of the present invention can also be used to produce a solid preparation by compression-molding a food together with a coloring agent, a flavor, or the like. Further, the powdered fat and/or oil composition of the present invention can be used as a coating applied on the surface of a powder of raw materials of a food, a feed, a pharmaceutical, a cosmetic, or the like. For example, such a coating can be used to coat the food surface to prevent deterioration or moisture absorption due to contact with the outside air or water, improve the flowability, and impart the sustained releasability, masking, elution prevention, acid resistance, and so forth. The powdered fat and/or oil composition of the present invention is edible by itself, is a food per se, and thus easily usable unlike a food additive such as calcium stearate conventionally used as an adhesive for food. Furthermore, by incorporating the aforementioned various additives into the powdered fat and/or oil composition of the present invention, the resultant can be utilized as a food additive having an adhesiveness. The powdered fat and/or oil composition of the present invention containing the fat and/or oil ingredient as a raw material does not need to contain another known adhesive, and thus can be used with ensured safety as a food.

<Usage as Adhesive>

The powdered fat and/or oil composition of the present invention can be utilized as an adhesive or as a portion of an adhesive. For example, the powdered fat and/or oil composition of the present invention can be used when two articles (foods, feeds, pharmaceuticals, cosmetics, or the like) are made to adhere to each other. Particularly, since the particles of the powdered fat and/or oil composition of the present invention have a plate-like shape, the area where the particles adhere to an article is large, so that the particles have a stronger adhesive force in comparison with spherical particles. There is such a trend that the finer the average particle diameter of the powdered fat and/or oil composition of the present invention as an adhesive, the stronger the adhesive force. The particles of the powdered fat and/or oil composition have an average particle diameter of for example 20 μm or less, preferably 0.1 to 20 μm, more preferably 10 μm or less, and further preferably 1 to 10 μm, in view of the adhesive force. For example, when measured under Adhesion Test Condition 1 to a stainless plate described in the following Examples, the adhesive composition containing the powdered fat and/or oil of the present invention having an average particle diameter of 6.4 to 10.4 μm has an adhesive force of preferably 5.0 nN or more, more preferably 10.0 nN or more, and further preferably 15.0 nN or more. A suitable range of this adhesive force is, for example, 5 to 50.0 nN, preferably 10.0 to 40.0 nN, and more preferably 15.0 to 35.0 nN. Moreover, for example, when measured under Adhesion Test Condition 2 to a stainless plate described in the following Examples, the adhesive composition containing the powdered fat and/or oil of the present invention having an average particle diameter of 7.2 to 7.9 μm has an adhesive force of preferably 0.1 nN or more, more preferably 0.3 nN or more, and further preferably 0.5 nN or more. A suitable range of this adhesive force is, for example, 0.1 to 10.0 nN, preferably 0.3 to 5.0 nN, more preferably 0.5 to 3.0 nN. The amount of the adhesive of the present invention relative to a food is the same as the content of the powdered fat and/or oil composition in the food containing the fat and/or oil composition described above.

Relative to, for example, 100% by mass of the finally obtained adhesive as a whole, the content of the powdered fat and/or oil composition in the adhesive of the present invention may be, for example, 1% by mass or more, 5% by mass or more, 10% by mass or more, 30% by mass or more, 50% by mass or more, 70% by mass or more, 80% by mass or more, and 90% by mass or more, and may be 100% or less, 90% by mass or less, 80% by mass or less, 70% by mass or less, 50% by mass or less, 40% by mass or less, 30% by mass or less, and 10% by mass or less, or may be 100% by mass. The content of the powdered fat and/or oil composition in the adhesive of the present invention may be, for example, 1 to 99% by mass, preferably 10 to 90% by mass, more preferably 15 to 85% by mass, and further preferably 20 to 80% by mass.

<Usage as Coating>

The powdered fat and/or oil composition of the present invention can also be utilized as a coating. For example, the powdered fat and/or oil composition of the present invention can be used when the surface of a powder of raw materials of a food, a feed, a pharmaceutical, a cosmetic, or the like is coated. Particularly, since the powdered fat and/or oil composition of the present invention has an adhesiveness by itself, the surface of a powder can be coated with a sufficient adhesive force without using another adhesive. For example, the surface of a powder, such as caster sugar, which is likely to absorb moisture is coated therewith, making it possible to prevent the moisture absorption and the caking. Moreover, in a case where the powdered fat and/or oil composition of the present invention is applied onto the surface of an article, such as jelly, which has a flowability, the coating has such a self-restoration ability that even when the coating on the surface is partially removed by applying an impact to or cutting the surface of the jelly, the removed site is again coated through the assembly of the powdered fat and/or oil composition therearound. Further, since the particles of the powdered fat and/or oil composition of the present invention have a plate-like shape, the coated area is large when the particles adhere to an article in comparison with spherical (or circular) particles, making it possible to minimize the uncoated surface of the article. For example, approximately 80% or more, preferably 85% or more, and more preferably 90% or more, of the surface area of an article can be coated with the powdered fat and/or oil composition of the present invention; the coating may be, for example, approximately 98% or less, preferably 99% or less, and more preferably 99.5% or less, of the surface area. Relative to, for example, 100% by mass of the finally obtained adhesive as a whole, the content of the powdered fat and/or oil composition in the coating of the present invention may be, for example, 1% by mass or more, 5% by mass or more, 10% by mass or more, 30% by mass or more, 50% by mass or more, 70% by mass or more, 80% by mass or more, and 90% by mass or more, and may be 100% or less, 90% by mass or less, 80% by mass or less, 70% by mass or less, 50% by mass or less, 40% by mass or less, 30% by mass or less, and 10% by mass or less, or may be 100% by mass. The content of the powdered fat and/or oil composition in the coating of the present invention may be, for example, 1 to 99% by mass, preferably 10 to 90% by mass, more preferably 15 to 85% by mass, and further preferably 20 to 80% by mass.

<Measurement Method for Adhesion Force>

Herein, although not bound by any theory, the adhesion force acting between two particles includes van der Waals force, electrostatic force, and liquid bridge force. It is said that the magnitudes of electrostatic force, van der Waals force, and liquid bridge force increase in this order. The method for measuring the adhesion force is roughly classified into cases of measuring the adhesion force of individual particles or of a powder layer. The measurement method for individual particles includes a spring balance method, a pendulum method, a centrifugation method, an impact method, a vibration method, a method using an atomic force microscope, and the like (Reference Literature 1: Process Design and Trouble Shooting in Powder & Nanoparticle Processing, Technosystem Co., Ltd., PP. 137-139; Reference Literature 2: "Hajimeteno Funtai Gijutsu (Introduction to Powder Technology)" Kogyo Chosakai Publishing Co., Ltd., PP. 27-29). Among these, a centrifugation method has a simple principle and is applicable under wide measurement conditions and easy to perform, and the measurement method is preferably utilizable as the evaluation method of the present invention.

An example of a specific centrifugation method includes a method for testing an adhesion to a stainless plate. For example, in the method, using an adhesion-force measurement system (such as NS-C300-HK manufactured by Nano Seeds Corporation), a powder sample is made to adhere onto the surface of a standard stainless plate, and centrifuged at a specific centrifugal force; then, the centrifugal force is plotted on the vertical axis, while the residual percentage of the powder on the plate is plotted on the horizontal axis to calculate a centrifugal force at the residual percentage of 50% by mass as an adhesion force. The specific measurement conditions include the following Condition 1 and Condition 2 under which the centrifugal force is increased stepwise. Note that the unit of the centrifugal force is expressed by the ratio to gravitational acceleration of the earth and "Relative Centrifugal Force" (RCF) is used. It is normally expressed with "G".

Condition 1
Centrifugal forces: 1000, 2000, 4000, 8000, 12000, and 16000 (G) (centrifuged at each centrifugal force for 1 minute)

Condition 2
Centrifugal forces: 100, 200, 400, 800, 1600, 3200, and 6400 (G) (centrifuged at each centrifugal force for 1 minute)

<Relation between Adhesion Force and Particle Diameter>

Although the present invention is not intended to be taken in a limited sense by any theory, the adhesion force of the powdered fat and/or oil composition of the present invention is said to be proportional to approximately the first power of the particle diameter (average particle diameter) of the composition, and the gravity is said to be proportional to the third power of the particle diameter. Moreover, it is said that the balance is achieved when the particle diameter is approximately 30 μm (Reference Literature 3: Process Design and Trouble Shooting in Powder & Nanoparticle Processing, Technosystem Co., Ltd., PP. 137-139; Reference Literature 4: "Hajimeteno Funtai Gijutsu (Introduction to Powder Technology)" Kogyo Chosakai Publishing Co., Ltd., PP. 27-29; Reference Literature 5: "Fushigina Konano Sekai (Marvelous Powder World)" Konawo Kagakusuru (Scientifically Study Powders), edited by the Association of Powder Process Industry and Engineering, JAPAN, the Nikkan Kogyo Shimbun, Ltd., PP. 36-37). To be put it differently, normally, if the particle diameter is 30 μm or less, the adhesion force is stronger than the gravity, so that the particles do not fall due to the own weight and are likely to adhere to a substance. Thus, in order to obtain the particle diameter with a strong adhesion force, the particle diameter should be as small as possible. However, it goes without saying that there has been a problem to be solved particularly in fat and/or oil powders that it is quite difficult to industrially produce particles having small particle diameters. The present invention has revealed that even when the above-described electrostatic force and liquid bridge force cannot be expected, a high adhesion force can be obtained from a powdered fat and/or oil composition (particles) containing a fat and/or oil ingredient containing a specific XXX triglyceride and a β-form fat and/or oil and having a plate-like shape and specific particle diameters.

EXAMPLES

Next, the present invention will be described in detail based on Comparative Examples and Examples.

[Analysis Methods]

Triglyceride Composition

Gas Chromatography Analysis Conditions

DB1-ht (0.32 mm×0.1 μm×5 m) Agilent Technologies Inc. (123-1131)

Injected amount: 1.0 μL

Injection inlet: 370° C.

Detector: 370° C.

Split ratio: 50/1, 35.1 kPa constant pressure

Column CT: 200° C. (0 min hold) to (15° C./min) to 370° C. (4 min hold)

X-Ray Diffraction Measurement

The measurement was performed using an X-ray diffraction system Ultima IV (manufactured by Rigaku Corporation), CuKα (λ=1.542 Å) as the radiation source and a filter for Cu under conditions of: an output of 1.6 kW, an operation angle of 0.96 to 30.0°, and a measurement speed of 2°/minute. This measurement confirmed the existences of an α-form fat and/or oil, a (3'-form fat and/or oil, and a β-form fat and/or oil in a fat and/or oil ingredient containing a XXX triglyceride. If there was a peak only near 4.6 Å and no peak near 4.1 to 4.2 Å, all the fat and/or oil ingredient was determined as a β-form fat and/or oil.

Note that, from the X-ray diffraction measurement result, a peak intensity ratio=[β-form characteristic peak intensity (2θ=19° (4.6 Å))/(α-form characteristic peak intensity (2θ=21° (4.2 Å))+β-form characteristic peak intensity (2θ=19° (4.6 Å)))] was measured as the indicator indicating the abundance of the β-form fat and/or oil.

Loose Bulk Density

The loose bulk densities (g/cm$^3$) of powdered fat and/or oil compositions obtained in Examples and so forth were determined by: letting each powdered fat and/or oil composition fall approximately 2 cm above an upper opening end of a graduated cylinder with an inner diameter 15 mm×25 mL to loosely fill the graduated cylinder; measuring a mass (g) and reading a volume (mL) thus filled; and calculating a mass (g) of the powdered fat and/or oil composition per mL.

Crystal (Micrograph)

Figure 4:
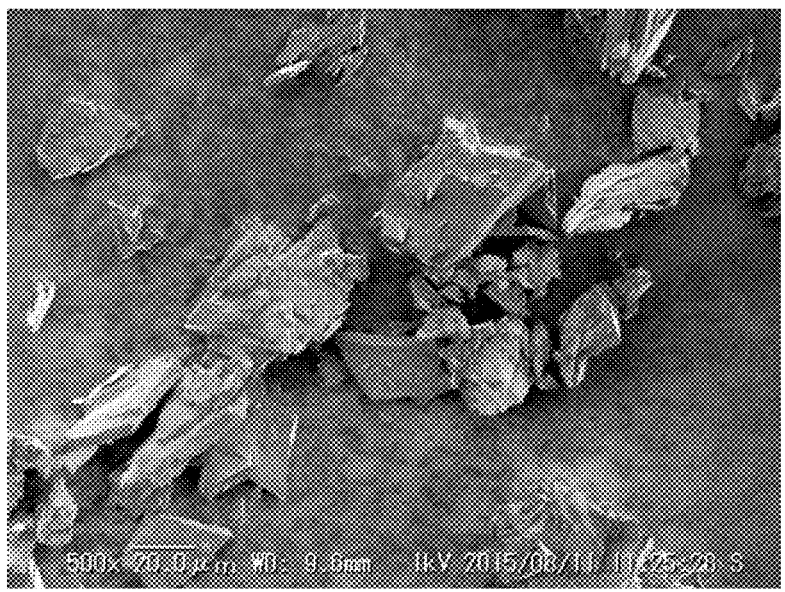
FIG. 4 is a micrograph of the powdered fat and/or oil composition (β-form fat and/or oil) of Example 7 of the present invention.
Figure 5:
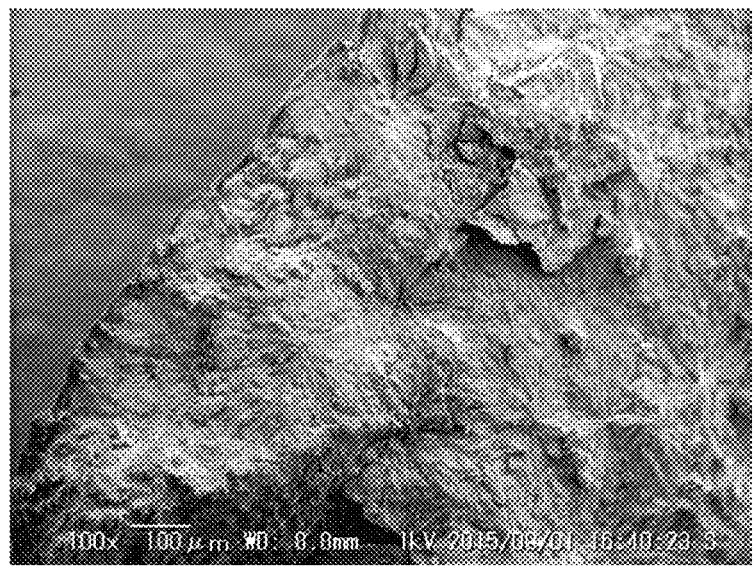
FIG. 5 is a micrograph of the fat and/or oil composition (α-form fat and/or oil) of Comparative Example 3 of the present invention.
Figure 6:
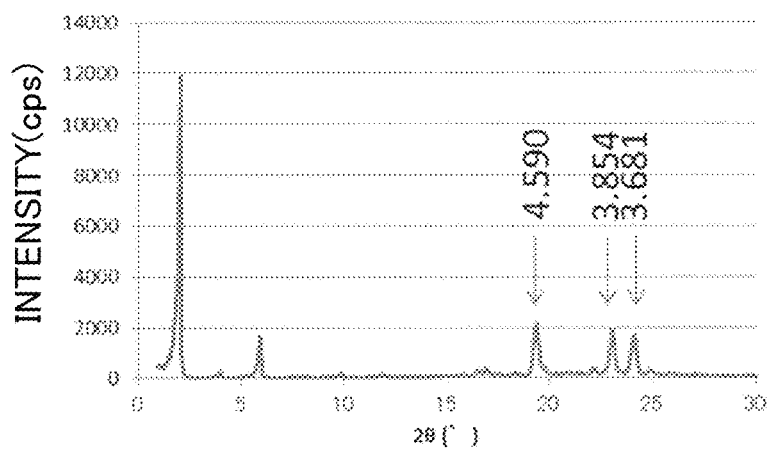
FIG. 6 is an X-ray diffractogram of the powdered fat and/or oil composition (β-form fat and/or oil) of Example 7 of the present invention.
Figure 7:
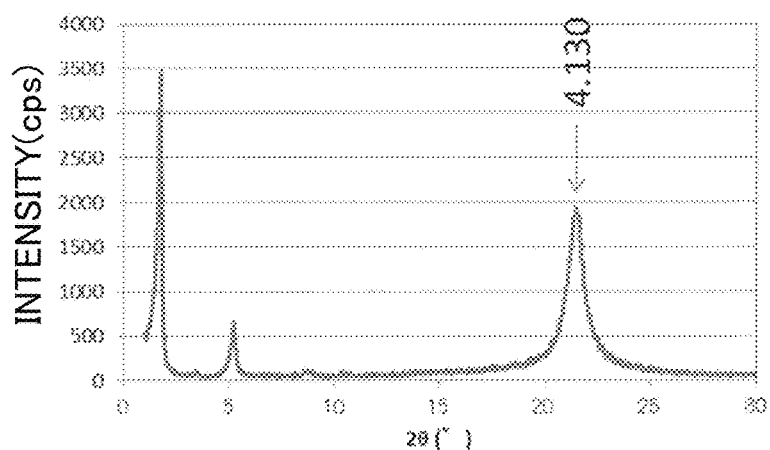
FIG. 7 is an X-ray diffractogram of the fat and/or oil composition (α-form fat and/or oil) of Comparative Example 3 of the present invention.

Images of crystals of the obtained powdered fat and/or oil compositions were captured using a 3D real surface view microscope VE-8800 (manufactured by Keyence Corporation). The obtained micrographs are shown in FIG. 4 (Production Example 7) and FIG. 5 (Comparative Production Example 3).

Aspect Ratio

Particles were directly observed with a scanning electron microscope S-3400N (manufactured by Hitachi High-Technologies Corporation). Using software for measuring particle size distribution through image analysis (Mac-View manufactured by Mountech Co., Ltd.), arbitrarily selected particles were measured for lengths in the major-axis and minor-axis directions, and the average of the measured particles was obtained.

Average Particle Diameter

The average particle diameters were measured based on laser diffraction/scattering methods (ISO133201, ISO9276-1) using a particle size distribution measuring apparatus (Microtrac MT3300ExII manufactured by Nikkiso Co., Ltd.).

Test Example 1 Preparation and Evaluation of Powdered Fat and/or Oil Compositions (Example 1): x=16

First, 25 g of a triglyceride having palmitic acid residues (each having 16 carbon atoms) at positions 1 to 3 (XXX type: 89.7% by mass, tripalmitin, manufactured by Tokyo Chemical Industry Co., Ltd.) was maintained at 80° C. for 0.5 hours and completely melted. The resultant was cooled in a thermostatic chamber at 50° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio: 2.0, average particle diameter: 119 μm, X-ray diffraction measurement diffraction peak: 4.6 Å, peak intensity ratio: 0.90) was obtained.

(Example 2): x=16

First, 25 g of a triglyceride having palmitic acid residues (each having 16 carbon atoms) at positions 1 to 3 (XXX type: 69.9% by mass, hard palm stearin, manufactured by The Nisshin OilliO Group, Ltd.) was maintained at 80° C. for 0.5 hours and completely melted. The resultant was cooled in a thermostatic chamber at 50° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.3 g/cm$^3$, aspect ratio of 1.4, average particle diameter of 99 μm, X-ray diffraction measurement diffraction peak: 4.6 Å, peak intensity ratio: 0.88) was obtained.

(Example 3): x=16, Tempering Process (c2)

First, 15 g of a triglyceride having palmitic acid residues (each having 16 carbon atoms) at positions 1 to 3 (XXX type: 89.7% by mass, tripalmitin, manufactured by Tokyo Chemical Industry Co., Ltd.) was maintained at 80° C. for 0.5 hours and completely melted. The resultant was cooled in a thermostatic chamber at 30° C. for 0.01 hours, and then left standing in the thermostatic chamber at 60° C. for 2 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 2.0, average particle diameter of 87 μm, X-ray diffraction measurement diffraction peak: 4.6 Å, peak intensity ratio: 0.89) was obtained.

(Example 4): x=16, Seeding Process (c1)

First, 15 g of a triglyceride having palmitic acid residues (each having 16 carbon atoms) at positions 1 to 3 (XXX type: 89.7% by mass, tripalmitin, manufactured by Tokyo Chemical Industry Co., Ltd.) was maintained at 80° C. for 0.5 hours and completely melted. The resultant was cooled in a thermostatic chamber at 60° C. until the product temperature reached 60° C. Then, the tripalmitin fat and/or oil powder was added in an amount of 0.1% by mass to the raw material fat and/or oil, and left standing in the thermostatic chamber at 60° C. for 2 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 2.0, average particle diameter of 92 μm, X-ray diffraction measurement diffraction peak: 4.6 Å, peak intensity ratio: 0.89) was obtained.

(Example 5): x=18

First, 3 g of a triglyceride having stearic acid residues (each having 18 carbon atoms) at positions 1 to 3 (XXX type: 99.6% by mass, tristearin, manufactured by Sigma-Aldrich Corporation) was maintained at 80° C. for 0.5 hours and completely melted. The resultant was cooled in a thermostatic chamber at 60° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 2.0, average particle diameter of 30 μm, X-ray diffraction measurement diffraction peak: 4.6 Å, peak intensity ratio: 0.93) was obtained.

(Example 6): x=18

First, 25 g of a triglyceride having stearic acid residues (each having 18 carbon atoms) at positions 1 to 3 (XXX type: 96.0% by mass, tristearin, manufactured by Tokyo Chemical Industry Co., Ltd.) was maintained at 80° C. for 0.5 hours and completely melted. The resultant was cooled in a thermostatic chamber at 55° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 2.0, average particle diameter of 31 μm, X-ray diffraction measurement diffraction peak: 4.6 Å, peak intensity ratio: 0.88) was obtained.

(Example 7): x=18

First, 25 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The resultant was cooled in a thermostatic chamber at 55° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 1.6, average particle diameter of 54 μm, X-ray diffraction measurement diffraction peak: 4.6 Å, peak intensity ratio: 0.89) was obtained.

(Example 8): x=18

First, 25 g of a triglyceride having stearic acid residues (each having 18 carbon atoms) at positions 1 to 3 (XXX type: 66.7% by mass, highly hydrogenated soybean oil, manufactured by Yokozeki Oil & Fat Industries Co.) was maintained at 80° C. for 0.5 hours and completely melted.

The resultant was cooled in a thermostatic chamber at 55° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.3 g/cm$^3$, aspect ratio of 1.4, average particle diameter of 60 μm, X-ray diffraction measurement diffraction peak: 4.6 Å, peak intensity ratio: 0.91) was obtained.

(Example 9): x=18

First, a triglyceride having stearic acid residues (each having 18 carbon atoms) at positions 1 to 3 (XXX type: 84.1% by mass, Nisshin sunflower seed oil (S) (high oleic sunflower seed oil), manufactured by The Nisshin OilliO Group, Ltd.) was completely hydrogenated according to a conventional method. Thereby, a hydrogenated product (XXX type: 83.9% by mass) was obtained. Then, 25 g of the obtained highly hydrogenated oil of the high oleic sunflower seed oil was maintained at 80° C. for 0.5 hours and completely melted. The resultant was cooled in a thermostatic chamber at 55° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 1.6, average particle diameter of 48 μm, X-ray diffraction measurement diffraction peak: 4.6 Å, peak intensity ratio: 0.89) was obtained.

(Example 10): x=18

First, 18.75 g of a triglyceride having stearic acid residues (each having 18 carbon atoms) at positions 1 to 3 (XXX type: 66.7% by mass, highly hydrogenated soybean oil, manufactured by Yokozeki Oil & Fat Industries Co.) was mixed with 6.25 g of another triglyceride having stearic acid residues (each having 18 carbon atoms) at positions 1 to 3 (XXX type: 11.1% by mass, highly hydrogenated palm oil, manufactured by Yokozeki Oil & Fat Industries Co.). Thereby, a raw material fat and/or oil was prepared (XXX type: 53.6% by mass). The raw material fat and/or oil was maintained at 80° C. for 0.5 hours and completely melted. The resultant was cooled in a thermostatic chamber at 55° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.3 g/cm$^3$, aspect ratio of 1.4, average particle diameter of 63 μm, X-ray diffraction measurement diffraction peak: 4.6 Å, peak intensity ratio: 0.78) was obtained. Note that the highly hydrogenated palm oil has a very low XXX triglyceride content, and thus used as an ingredient for dilution (hereinafter the same).

(Example 11): x=18, Seeding Process (c1)

First, 25 g of a triglyceride having stearic acid residues (each having 18 carbon atoms) at positions 1 to 3 (XXX type: 96.0% by mass, tristearin, manufactured by Tokyo Chemical Industry Co., Ltd.) was maintained at 80° C. for 0.5 hours and completely melted. The resultant was cooled in a thermostatic chamber at 70° C. until the product temperature reached 70° C. Then, the tristearin fat and/or oil powder was added in an amount of 0.1% by mass to the raw material fat and/or oil, and left standing in the thermostatic chamber at 70° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 2.0, average particle diameter of 36 μm, X-ray diffraction measurement diffraction peak: 4.6 Å, peak intensity ratio: 0.88) was obtained.

(Example 12): x=18, Tempering Process (c2)

First, 15 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The resultant was cooled in a thermostatic chamber at 50° C. for 0.1 hours, and then left standing in the thermostatic chamber at 65° C. for 6 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 1.6, average particle diameter of 50 μm, X-ray diffraction measurement diffraction peak: 4.6 Å, peak intensity ratio: 0.90) was obtained.

(Example 13): x=18, Tempering Process (c2)

First, 15 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The resultant was cooled in a thermostatic chamber at 40° C. for 0.01 hours, and then left standing in the thermostatic chamber at 65° C. for 2 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 1.6, average particle diameter of 52 μm, X-ray diffraction measurement diffraction peak: 4.6 Å, peak intensity ratio: 0.89) was obtained.

(Example 14): x=18, Pre-Cooling Process (c3)

First, 25 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The raw material fat and/or oil was kept until 70° C. in a thermostatic chamber at 70° C., and cooled in the thermostatic chamber at 65° C. for 8 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 1.6, average particle diameter of 60 μm, X-ray diffraction measurement diffraction peak: 4.6 Å, peak intensity ratio: 0.89) was obtained.

(Example 15): x=20

First, 10 g of a triglyceride having arachidic acid residues (each having 20 carbon atoms) at positions 1 to 3 (XXX type: 99.5% by mass, triarachidin, manufactured by Tokyo Chemical Industry Co., Ltd.) was maintained at 90° C. for 0.5 hours and completely melted. The resultant was cooled in a thermostatic chamber at 72° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 2.0, average particle diameter of 42 μm, X-ray diffraction measurement diffraction peak: 4.6 Å, peak intensity ratio: 0.92) was obtained.

(Example 16): x=22

First, 10 g of a triglyceride having behenic acid residues (each having 22 carbon atoms) at positions 1 to 3 (XXX type: 97.4% by mass, tribehenin, manufactured by Tokyo Chemical Industry Co., Ltd.) was maintained at 90° C. for 0.5 hours and completely melted. The resultant was cooled in a thermostatic chamber at 79° C. for 12 hours. Thereby, a solid having voide with an increased volume was formed. After the crystallization was completed, the cooling was performed until a room temperature (25° C.) condition. The obtained solid was loosened. Thus, a powdered crystalline composition (loose bulk density: 0.2 g/cm$^3$, aspect ratio of 2.0, average particle diameter of 52 μm, X-ray diffraction measurement diffraction peak: 4.6 Å, peak intensity ratio: 0.93) was obtained.

(Example 17): x=16, 18

First 12.5 g of a triglyceride having palmitic acid residues (each having 16 carbon atoms) at positions 1 to 3 (XXX type: 89.7% by mass, tripalmitin, manufactured by Tokyo Chemical Industry Co., Ltd.) was mixed with 12.5 g of a triglyceride having stearic acid residues (each having 18 carbon atoms) at positions 1 to 3 (XXX type: 96.0% by mass, tristearin, Tokyo Chemical Industry Co., Ltd.). Thereby, a raw material fat and/or oil was prepared (XXX type: 93.8%). The raw material fat and/or oil was maintained at 80° C. for 0.5 hours and completely melted. The resultant was cooled in a thermostatic chamber at 55° C. for 16 hours. Thereby, a solid having voide with an increased volume was formed and then loosened. Thus, a powdered crystalline composition (loose bulk density: 0.2 g/cm$^3$, aspect ratio of 1.6, average particle diameter of 74 μm, X-ray diffraction measurement diffraction peak: 4.6 Å, peak intensity ratio: 0.90) was obtained.

(Example 18): x=16, 18

First, 12.5 g of a triglyceride having palmitic acid residues (each having 16 carbon atoms) at positions 1 to 3 (XXX type: 69.9% by mass, hard palm stearin, manufactured by The Nisshin OilliO Group, Ltd.) was mixed with 12.5 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.). Thereby, a raw material fat and/or oil was prepared (XXX type: 75.3%). The raw material fat and/or oil was maintained at 80° C. for 0.5 hours and completely melted. The resultant was cooled in a thermostatic chamber at 55° C. for 16 hours. Thereby, a solid having voide with an increased volume was formed and then loosened. Thus, a powdered crystalline composition (loose bulk density: 0.3 g/cm$^3$, aspect ratio of 1.4, average particle diameter of 77 μm, X-ray diffraction measurement diffraction peak: 4.6 Å, peak intensity ratio: 0.88) was obtained.

(Comparative Example 1): x=16

First, 25 g of a triglyceride having palmitic acid residues (each having 16 carbon atoms) at positions 1 to 3 (XXX type: 89.7% by mass, tripalmitin, manufactured by Tokyo Chemical Industry Co., Ltd.) was maintained at 80° C. for 0.5 hours and completely melted. The resultant was cooled in a thermostatic chamber at 25° C. for 4 hours, and completely solidified (X-ray diffraction measurement diffraction peak: 4.1 Å, peak intensity ratio: 0.10). Thus, a powdered crystalline composition was not obtained.

(Comparative Example 2): x=16, 18

First, 12.5 g of a triglyceride having palmitic acid residues (each having 16 carbon atoms) at positions 1 to 3 (XXX type: 69.9% by mass, hard palm stearin, manufactured by The Nisshin OilliO Group, Ltd.) was mixed with 12.5 g of a triglyceride having stearic acid residues (each having 18 carbon atoms) at positions 1 to 3 (XXX type: 11.1% by mass, highly hydrogenated palm oil, manufactured by Yokozeki Oil & Fat Industries Co.). Thereby, a raw material fat and/or oil was prepared (XXX type: 39.6% by mass). The raw material fat and/or oil was maintained at 80° C. for 0.5 hours and completely melted. The resultant was cooled in a thermostatic chamber at 40° C. for hours, and completely solidified (X-ray diffraction measurement diffraction peak: 4.2 Å, peak intensity ratio: 0.12). Thus, a powdered crystalline composition was not obtained.

(Comparative Example 3): x=18

First, 25 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The resultant was cooled in a thermostatic chamber at 40° C. for 3 hours, and completely solidified (X-ray diffraction measurement diffraction peak: 4.1 Å, peak intensity ratio: 0.11). Thus, a powdered crystalline composition was not obtained.

(Comparative Example 4): x=18

First, 12.5 g of a triglyceride having stearic acid residues (each having 18 carbon atoms) at positions 1 to 3 (XXX type: 66.7% by mass, highly hydrogenated soybean oil, manufactured by Yokozeki Oil & Fat Industries Co.) was mixed with 12.5 g of another triglyceride having stearic acid residues (each having 18 carbon atoms) at positions 1 to 3 (XXX type: 11.1% by mass, highly hydrogenated palm oil, manufactured by Yokozeki Oil & Fat Industries Co.). Thereby, a raw material fat and/or oil was prepared (XXX type: 39.7% by mass). The raw material fat and/or oil was maintained at 80° C. for 0.5 hours and completely melted. The resultant was cooled in a thermostatic chamber at 55° C. for 12 hours, and completely solidified (X-ray diffraction measurement diffraction peak: 4.2 Å, peak intensity ratio: 0.12). Thus, a powdered crystalline composition was not obtained.

Table 2 summarizes the results of Examples and Comparative Examples described above.

TABLE 2

| | Fat and/or oil ingredient | X number of carbon atoms | XXX type triglyceride (% by mass) | Loose bulk density (g/cm³) | Aspect ratio | Average particle diameter (μm) | X-ray diffraction measurement diffractron peak (Å) | Peak intensity ratio | Tempering temperature/ hour | Cooling final temperature/hour |
|---|---|---|---|---|---|---|---|---|---|---|
| Example 1 | tripalmitin | 16 | 89.7 | 0.2 | 2.0 | 119 | 4.6 | 0.90 | — | 50° C./12 hours |
| Example 2 | hard palm stearin | 16 | 69.9 | 0.3 | 1.4 | 99 | 4.6 | 0.88 | — | 50° C./12 hours |
| Example 3 | tripalmitin | 16 | 89.7 | 0.2 | 2.0 | 87 | 4.6 | 0.89 | 30° C./0.01 hours | 60° C./2 hours |
| Example 4 | tripalmitin | 16 | 89.7 | 0.2 | 2.0 | 92 | 4.6 | 0.89 | — | 60° C./2 hours |
| Example 5 | tristearin | 18 | 99.6 | 0.2 | 2.0 | 30 | 4.6 | 0.93 | — | 60° C./12 hours |
| Example 6 | tristearin | 18 | 96.0 | 0.2 | 2.0 | 31 | 4.6 | 0.88 | — | 55° C./12 hours |
| Example 7 | highly hydrogenated rapeseed oil | 18 | 79.1 | 0.2 | 1.6 | 54 | 4.6 | 0.89 | — | 55° C./12 hours |
| Example 8 | highly hydrogenated soybean oil | 18 | 66.7 | 0.3 | 1.4 | 60 | 4.6 | 0.91 | — | 55° C./12 hours |
| Example 9 | highly hydrogenated high oleic sunflower seed oil | 18 | 83.9 | 0.2 | 1.6 | 48 | 4.6 | 0.89 | — | 55° C./12 hours |
| Example 10 | highly hydrogenated soybean oil, highly hydrogenated palm oil | 18 | 53.6 | 0.3 | 1.4 | 63 | 4.6 | 0.78 | — | 55° C./12 hours |
| Example 11 | tristearin | 18 | 96.0 | 0.2 | 2.0 | 36 | 4.6 | 0.88 | — | 70° C./12 hours |
| Example 12 | highly hydrogenated rapeseed oil | 18 | 79.1 | 0.2 | 1.6 | 50 | 4.6 | 0.90 | 50° C./0.1 hours | 65° C./6 hours |
| Example 13 | highly hydrogenated rapeseed oil | 18 | 79.1 | 0.2 | 1.6 | 52 | 4.6 | 0.89 | 40° C./0.01 hours | 65° C./2 hours |
| Example 14 | highly hydrogenated rapeseed oil | 18 | 79.1 | 0.2 | 1.6 | 60 | 4.6 | 0.89 | — | 65° C./8 hours |
| Example 15 | triarachidin | 20 | 99.5 | 0.2 | 2.0 | 42 | 4.6 | 0.92 | — | 72° C./12 hours |
| Example 16 | tribehenin | 22 | 97.4 | 0.2 | 2.0 | 52 | 4.6 | 0.93 | — | 79° C./12 hours |
| Example 17 | tripalmitin, tristearin | 16, 18 | 93.8 | 0.2 | 1.6 | 74 | 4.6 | 0.90 | — | 55° C./16 hours |
| Example 18 | hard palm stearin, highly hydrogenated rapeseed oil | 16, 18 | 75.3 | 0.3 | 1.4 | 77 | 4.6 | 0.88 | — | 55° C./16 hours |
| Comparative Example 1 | tripalmitin | 16 | 89.7 | — | — | — | 4.1 | 0.10 | — | 25° C./4 hours |
| Comparative Example 2 | hard palm stearin, highly hydrogenated palm oil | 16, 18 | 39.6 | — | — | — | 4.2 | 0.12 | — | 40° C./12 hours |
| Comparative Example 3 | highly hydrogenated rapeseed oil | 18 | 79.1 | — | — | — | 4.1 | 0.11 | — | 40° C./3 hours |
| Comparative Example 4 | highly hydrogenated soybean oil, highly hydrogenated palm oil | 18 | 39.7 | — | — | — | 4.2 | 0.12 | — | 55° C./12 hours |

Examples of Foods

Next, the present invention will be described in more details based on Examples and Comparative Examples related to foods. However, the present invention is not limited to these at all.
<Raw Material Fat and/or Oil>
(1) Powdered Fat and/or Oil Composition A First, 25 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The resultant was cooled in a thermostatic chamber at 60° C. for 12 hours. Thereby, a solid having voide with an increased volume was formed. After the crystallization was completed, the cooling was performed until a room temperature (25° C.) condition. The obtained solid was pulverized with a hammer mill. Thus, a powdered crystalline composition (loose bulk density: 0.2 g/cm³, aspect ratio of 1.6, average particle diameter of 14.4 μm, X-ray diffraction measurement diffraction peak: 4.6 Å, peak intensity ratio: 0.89) was obtained. This powdered fat and/or oil composition A was used.
(2) Highly Hydrogenated Rapeseed Oil A triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was used. The raw material of the highly hydrogenated rapeseed oil was the above-described powdered fat and/or oil composition, the solid of which was crushed and ground (to an average particle diameter of 129 μm) with a mortar before melted at 80° C. as above. The highly hydrogenated rapeseed oil contained no β-form fat and/or oil, and was not in a powder form.
<Other Raw Materials>

Lecithin (manufactured by The Nisshin OilliO Group, Ltd.), cacao mass (manufactured by Daito Cacao Co., Ltd.), a whole milk powder (manufactured by Yotsuba Milk Products Co., Ltd.), and sugar (manufactured by Tokukura Corporation) used in Examples of chocolates and hard butters were all commercially available.

In addition, a hard butter A in Examples of chocolates and hard butters was produced as follows.

First, 8.8 parts by mass of high oleic sunflower seed oil, 48.4 parts by mass of palm stearin (iodine value: 36), 18.8 parts by mass of highly hydrogenated soybean oil, and 24.0 parts by mass of palm oil were mixed together. The obtained fat and/or oil mixture (40.9% by mass of palmitic acid, 20.0% by mass of stearic acid, 30.6% by mass of oleic acid, 6.3% by mass of linoleic acid, 0.2% by mass of linolenic acid, and 0% by mass of trans fatty acid) was subjected to random interesterification using sodium methylate as a catalyst. Thereby, an interesterified fat and/or oil was obtained. The obtained interesterified fat and/or oil was subjected to dry fractionation at 37±1° C., so that the high melting-point portion was removed and the low melting-point portion was obtained. The obtained low melting-point portion was subjected to acetone fractionation at 1±1° C., so that the low melting-point portion was removed and a high melting-point portion (iodine value: 32) was obtained. The obtained high melting-point portion was purified according to a conventional method, and used as the hard butter A in Examples.

Test Example 2 Effect of Improving Solidification Speed

<Production of Improved Hard Butter>

According to the formulas in Table 3 below, improved hard butters of Examples 19 to 21 and a hard butter of Comparative Example 5 were produced. More specifically, the hard butter A was temporarily melted at 60° C., and then tempered at 45° C. Subsequently, the powdered fat and/or oil composition A was added in an amount of 1% by mass, 3% by mass, 5% by mass, or 0% by mass, to 100% by mass of the hard butter, and homogenized for approximately 30 minutes with a mixer (universal mixing stirrer 8XDML: manufactured by DALTON Corporation) by heating to maintain the temperature at 45° C. Thus, the improved hard butters of Examples 19 to 21 and the hard butter of Comparative Example 5 were produced.

TABLE 3

Formula (% by mass) of improved hard butter

| Raw materials | Example 19 | Example 20 | Example 21 | Comparative Example 5 |
|---|---|---|---|---|
| Hard butter A | 100 | 100 | 100 | 100 |
| Powdered fat and/or oil composition A | 1 | 3 | 5 | 0 |

<Effect of Improving Solidification Speed>

Figure 8:
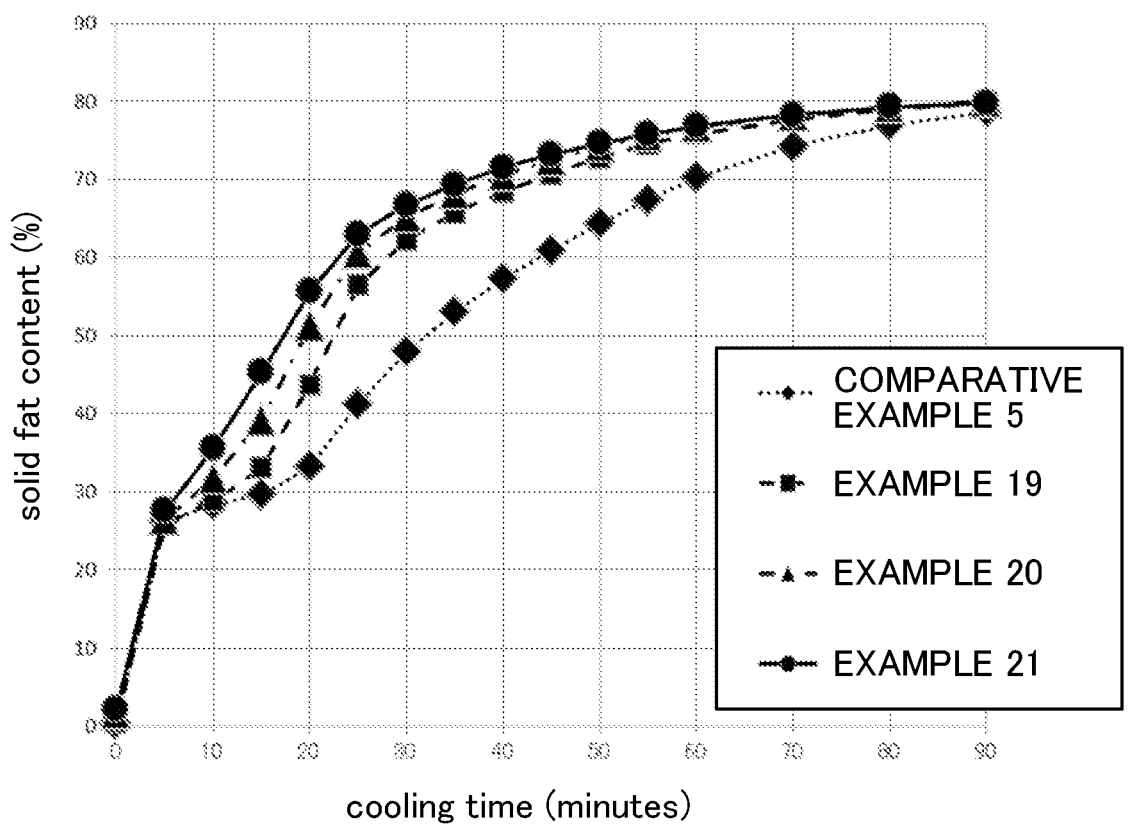
FIG. 8 is a graph for illustrating the effects of improving the solidification speed in Examples 19 to 21 of the present invention.

The solid fat contents of the improved hard butters of Examples 19 to 21 and the hard butter of Comparative Example 5 were measured using an SFC measuring system (product name: Minispec MQ-20, manufactured by Bruker Optics K. K.). FIG. 8 shows the result. Moreover, the effect of improving the "solidification speed" was determined from a curve of the solid fat contents (SFC) of the hard butters. Specifically, the test-target hard butters at 45° C. were measured every 5 minutes, starting from 0 minutes at which the temperature was cooled to 20° C. After 15 minutes, the solid fat content was measured (SFC, % by mass of the solid fat relative to 100% by mass of the hard butter). The hard butter was determined to have a high solidification speed if the SFC was high.

From FIG. 8, it was found out that when the cooling time (horizontal axis) was 15 minutes and later, Examples 19 to 21 had high solid fat contents at 20° C. (vertical axis) and improved solidification speeds in comparison with Comparative Example 5. In addition, the comparison among Examples 19 to 21 revealed that increasing the amount of the powdered fat and/or oil composition A added increases the solid fat content (vertical axis), and that the solidification speed can be improved depending on the amount of the powdered fat and/or oil composition A used. As described above, the use of the powdered fat and/or oil composition of the present invention improves the solidification speed of hard butters. Accordingly, it is conceivable that a chocolate produced by using an improved hard butter also similarly has an improved solidification speed. In addition, it is also suggested that the use of the powdered fat and/or oil composition of the present invention also similarly improves the solidification speed of a chocolate using no hard butter at all.

Test Example 3 Mold-Separation Speed of Chocolates

<Production of Improved Chocolates>

According to the formulas in Table 4 below, improved chocolates of Examples 22 and 23 and chocolates of Comparative Examples 6 and 7 were produced by cooling and solidification through a mixing process, a refining process, and a conching process according to a conventional method without tempering. More specifically, 1000 g of raw materials (such as cacao mass, the hard butter A, the powdered fat and/or oil composition A) were uniformly mixed using a mixer (universal mixing stirrer 8XDML: manufactured by DALTON Corporation) by heating to 60° C. for approximately 5 minutes. Thus, a chocolate mix was obtained. The obtained chocolate mix was ground and refined with a roll refiner (SDY hydraulic three-roll mill: manufactured by BUHLER AG) to an average particle size of approximately 20 μm. The refined chocolate mix was kneaded using the mixer for 20 minutes or longer. After the liquefaction, the oil content was adjusted to prepare a liquid raw chocolate. The liquid raw chocolate was tempered to 45° C., poured into a mold, and molded. Then, the liquid raw chocolate was cooled and solidified at 10 to 20° C. In this manner, the chocolates were obtained.

Note that, in Example 22, the powdered fat and/or oil composition A was added in an amount of 1% by mass relative to the oil content in the chocolate; in Example 23, the powdered fat and/or oil composition A was added in an amount of 5% by mass relative to the oil content in the chocolate. Meanwhile, Comparative Example 6 is a normal chocolate in which the powdered fat and/or oil composition A was not added at all. In Comparative Example 7, the highly hydrogenated rapeseed oil instead of the powdered fat and/or oil composition was added in an amount of 1% by mass relative to the oil content in the chocolate.

TABLE 4

Formula (% by mass) and evaluation of improved chocolate

| Blended raw materials | Example 22 | Example 23 | Comparative Example 6 | Comparative Example 7 |
|---|---|---|---|---|
| Powdered fat and/or oil composition A | 0.4 | 2.0 | — | — |
| Highly hydrogenated rapeseed oil | — | — | — | 0.4 |
| Hard butter A | 32.0 | 32.0 | 32.0 | 32.0 |
| Lecithin | 0.5 | 0.5 | 0.5 | 0.5 |
| Cacao mass | 14.4 | 14.4 | 14.4 | 14.4 |
| Cocoa powder | 0.6 | 0.6 | 0.6 | 0.6 |
| Whole milk powder | | | | |
| Sugar | 52.5 | 52.5 | 52.5 | 52.5 |
| Raw material total | 100.4 | 102.0 | 100.0 | 100.4 |
| Evaluation results | | | | |
| Melt-in-the-mouth | ○ | ○ | ○ | x |
| Bloom occurrence | ○ | ○ | ○ | x |

<Evaluation of Melt-in-the-Mouth>

The melt-in-the-mouth evaluation was performed using the chocolates obtained above. Five professional panelists ate the chocolates and evaluated the obtained melt-in-the-mouth of the chocolates according to the following criteria. Table 4 shows the evaluation result.

○: good melt-in-the-mouth and no leftover (gritty) perception.

Δ: good melt-in-the-mouth and little leftover (gritty) perception.

×: poor melt-in-the-mouth and considerable leftover (gritty) perception.

<Evaluation of Bloom Occurrence>

The chocolates were subjected to 19 cycles of periodic temperature changes and stored, one cycle consisting of a temperature of 15° C. for 12 hours and a temperature of 25° C. for 12 hours. Then, after the completion of the 19 cycles, the bloom occurrence was visually evaluated.

○: no bloom was observed.

×: bloom was observed.

<Evaluation of Mold-Separation Speed>

Figure 9:
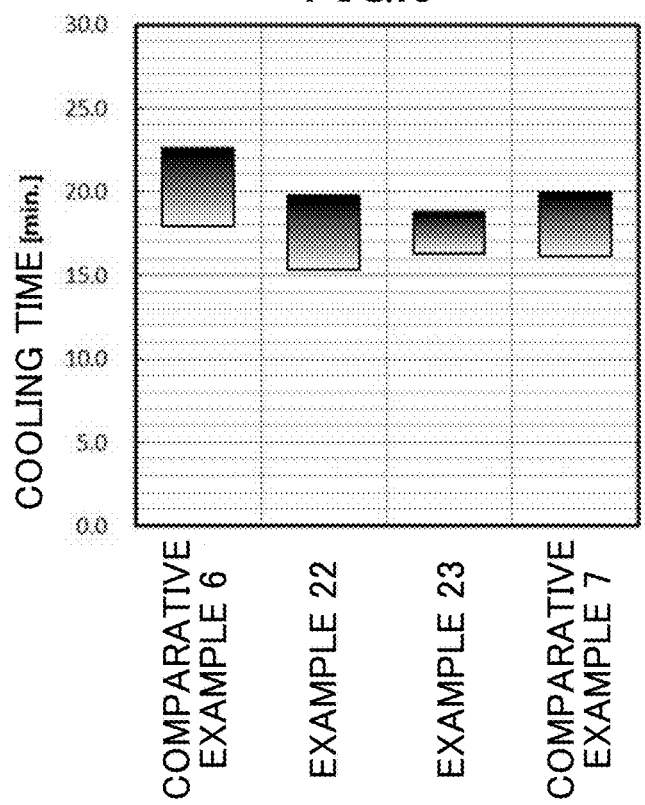
FIG. 9 is a graph for illustrating the effect of improving the mold-separation speed in Examples 22 and 23 of the present invention.

Each chocolate produced above was melted, with 120 g of which a transparent polycarbomate-made mold (167 mm×84 mm×11 mm) was filled and put in a refrigerator at 7° C. for molding. Note that the polycarbomate-made mold used for the molding had a bottom surface of a grid shape (the upper surface was 167 mm×84 mm and open). The total number of grids was 30 (5×6). The mold-release percentage of the molded chocolate was calculated according to the following mathematical equation by visually counting grids from which chocolate was released every 5 minutes after the cooling was started (chocolate appeared to rise in the grids when released). The time when the chocolate started to separate from the mold and the time when the mold-release percentage reached 90% or more were measured. FIG. 9 shows the result. Note that the releasability serves as the indicator of the productivity of chocolates. If the time until the mold-release percentage reached 90% or more was 20 minutes or less, it was determined that the chocolate had a favorable releasability (mold separation) and an excellent productivity.

Mold-release percentage (%)=the number of grids from which chocolates were released/total number of grids×100

From FIG. 9, in Comparative Example 6, the mold separation started when the cooling time was 18 minutes, and it took approximately 23 minutes until the mold-release percentage reached 90%. In addition, in Comparative Example 7, the mold separation started when the cooling time was 16 minutes, and it took approximately 20 minutes until the mold-release percentage reached 90%. However, in Example 22, the mold separation started when the cooling time was 15 minutes, and it took just 20 minutes until the mold-release percentage reached 90%. In Example 23, the mold separation started when the cooling time was 16 minutes, and it took only 19 minutes until the mold-release percentage reached 90%. In Examples 22 and 23, the time when the mold-release percentage reached 90% was apparently shorter than that in Comparative Example 6, revealing that the mold-separation speeds were enhanced. Meanwhile, in comparison between Examples 22 and 23, increasing the amount of the powdered fat and/or oil composition added increased the mold-separation speed, revealing that the mold-separation speed can be improved depending on the amount of the powdered fat and/or oil composition used. In addition, in Example 22, the time when the mold separation started was faster by approximately 1 minute than that in Comparative Example 7; hence, it can be said that the mold-separation speed was improved. Further, in Example 23, the time when the mold separation started was almost the same, but the time until the mold-release percentage reached 90% was faster by approximately 1 minute; hence, it can be said that the mold-separation speed was improved. As described above, it was found out that the use of the powdered fat and/or oil composition of the present invention improves the mold-separation speed of the chocolate.

<Effect of Increasing Heat Resistance of Chocolate>

Figure 10:
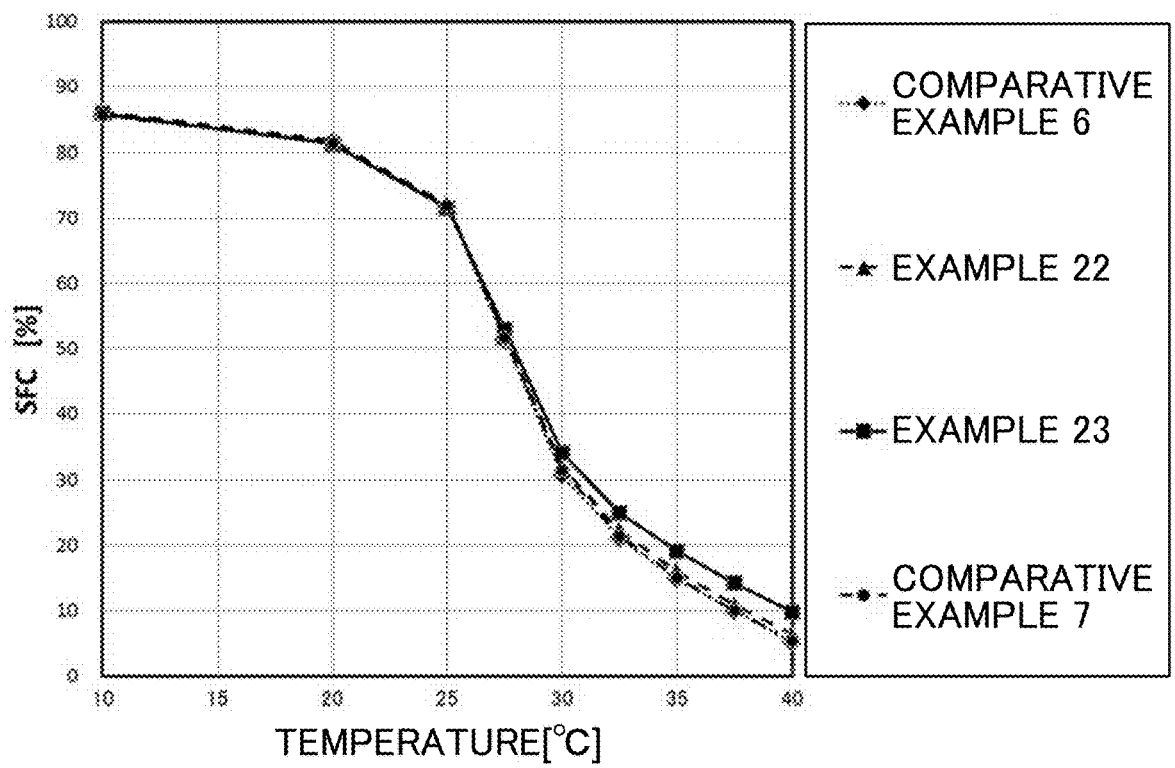
FIG. 10 is a graph for illustrating the effects of improving the heat-resistance limit temperature (heat resistance) in Examples 22 and 23 of the present invention.

The solid fat contents of the improved chocolates of Examples 22 and 23 and the chocolates of Comparative Examples 6 and 7 were measured using the SFC measuring system (product name: Minispec MQ-20, manufactured by Bruker Optics K. K.). Each chocolate solidified at 10° C. was put in the SFC measuring system, measured for the SFCs at 20° C. and 25° C. by increasing the temperature, and then further measured for the SFC every time the temperature was increased by 2.5° C. FIG. 10 shows the result.

The effect of increasing the "heat resistance" of a chocolate was determined from a curve of the solid fat contents (SFC) of the chocolates. Specifically, a chocolate was determined to have an increased heat resistance if the temperature immediately before the chocolate was completely melted, for example, a temperature at which the SFC was 10%, was high.

In FIG. 10, the SFC curve of Example 23 was located upwardly in comparison with Comparative Examples 6, 7. Particularly, in comparing the temperatures at which the SFC was 10%, it was approximately 40° C. in Example 23 and approximately 37° C. in Comparative Examples 6, 7. Thus, it was found out that the heat resistance was apparently increased in Example 23. However, there was no difference in heat resistance between Example 22 and Comparative Examples 6, 7. To put it differently, it is conceivable that adding a large amount of the high melting-point fat and/or oil enhanced the heat resistance. However, as apparent from the result of Table 4, since the particles of the powdered fat and/or oil composition of the present invention were quite small, no gritty (leftover) perception was exhibited. In contrast, in Comparative Example 7 in which the same high melting-point highly hydrogenated rapeseed oil was added, even though the added amount was small in comparison with Example 23, a considerable gritty (leftover) perception was exhibited. As described above, it was revealed that the use of the powdered fat and/or oil composition of the present invention can increase the heat resistance of the chocolate without gritty (leftover) perception. Further, in the bloom occurrence evaluation, no bloom occurrence was observed from Examples 22, 23 (the powdered fat and/or oil composition was added) and Comparative Example 6 (nothing was further added). In contrast, the bloom occurred in Comparative Example 7 (highly hydrogenated rapeseed oil). In this manner, chocolate bloom normally occurs by adding a high melting-point fat and/or oil. However, it was revealed that the use of the powdered fat and/or oil composition of the present invention can increase the heat resistance of the chocolate without bloom occurrence.

Test Example 4 Tests for Adhesives and Coatings

Preparation of Compositions of Examples and Comparative Examples (1) Powdered Fat and/or Oil Composition A Used in Examples 24 to 32

First, 25 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The resultant was cooled in a thermostatic chamber at 60° C. for 12 hours. Thereby, a solid having void with an increased volume was formed. After the crystallization was completed, the cooling was performed until a room temperature (25° C.) condition. The obtained solid was pulverized with a hammer mill (pulverizer) to obtain a powdered crystalline composition. This operation was repeated nine times in order to obtain various average particle diameters. In accordance with the order, powdered fat and/or oil compositions A of Examples 24 to 32 (loose bulk densities: 0.185 to 0.24 g/cm$^3$, aspect ratios of 1.6, average particle diameters of 6.4 to 10.4 μm, X-ray diffraction measurement diffraction peaks: 4.6 Å, peak intensity ratios: 0.89) were obtained (2) Highly Hydrogenated Rapeseed Oil Used in Comparative Example 8

First, 25 g of a triglyceride having stearic acid residues (each having 18 carbon atoms) at positions 1 to 3 (XXX type: 79.1% by mass, highly hydrogenated rapeseed oil, manufactured by Yokozeki Oil & Fat Industries Co.) was maintained at 80° C. for 0.5 hours and completely melted. The resultant was cooled in a thermostatic chamber at 40° C. for 3 hours, and pulverized with a hammer mill. Thus, a composition in an aggregate form (loose bulk density: 0.3 g/cm$^3$, aspect ratio of 1.4, average particle diameter of 21.6 μm, X-ray diffraction measurement diffraction peak: 4.1 Å, peak intensity ratio: 0.11) was obtained (Comparative Example 8 contains no β-form fat and/or oil).

(3) Calcium Stearate Used in Comparative Example 9

As calcium stearate used in Comparative Example 9, Parteck LUB CST manufactured by Merck KGaA (loose bulk density: 0.13 g/cm$^3$, aspect ratio of 1.4, average particle diameter of 6.5 μm) was prepared.

(4) Hydrogenated Palm Oil Used in Comparative Example 10

Using a hydrogenated palm oil (manufactured by Yokozeki Oil & Fat Industries Co.) as the raw material, a fat and/or oil powder (loose bulk density: 0.5 g/cm$^3$, aspect ratio of 1.0, average particle diameter of 162 μm) was obtained by spray-cooling with a spray cooler.

<Adhesion Test to Stainless Plate>

Using an adhesion-force measurement system (manufactured by Nano Seeds Corporation NS-C300-HK), each composition of Examples 24 to 32 and Comparative Examples 8 and 9 was made to adhere to the surface of a stainless plate (dimensions of 30 mm×20 mm) to conduct an experiment in which the composition was separated from the top of the plate by a centrifugal force. More specifically, the centrifugal force was increased stepwise according to Condition 1 or 2, and the composition was centrifuged at each centrifugal force for 1 minute. Then, the composition in a state remaining on the plate was recorded in an image, and compared with the original state before the centrifugation to thereby calculate the residual percentage. The centrifugal force was plotted on the vertical axis, while the residual percentage of the composition on the plate was plotted on the horizontal axis to calculate a centrifugal force at the residual percentage of 50% as an adhesion force. Note that, as measurement conditions in the adhesion force measurement, the following two were adopted.

Condition 1
 Centrifugal forces: 1000, 2000, 4000, 8000, 12000, and 16000 (G)
Condition 2
 Centrifugal forces: 100, 200, 400, 800, 1600, 3200, and 6400 (G)

TABLE 5

Examples 24 to 30 and Comparative Example 8

| | Loose bulk density (g/cm$^3$) | Average particle diameter (μm) | Adhesion force (nN) | Adhesion force measurement condition |
|---|---|---|---|---|
| Example 24 | 0.185 | 6.4 | 32.4 | Condition 1 |
| Example 25 | 0.186 | 6.5 | 17.6 | Condition 1 |
| Example 26 | 0.194 | 7.9 | 23.0 | Condition 1 |
| Example 27 | 0.198 | 8.9 | 26.0 | Condition 1 |
| Example 28 | 0.188 | 7.0 | 15.9 | Condition 1 |
| Example 29 | 0.240 | 10.4 | 15.0 | Condition 1 |
| Example 30 | 0.193 | 7.4 | 19.0 | Condition 1 |
| Comparative Example 8 | 0.300 | 21.6 | 1.0 | Condition 1 |

As shown in Table 5 above, when the powdered fat and/or oil compositions A of the present invention were used (Examples to 30), favorable adhesion forces were obtained. The composition of Comparative Example 8 was a coarse powder but a composition in an aggregate form, and the adhesion force was inferior in comparison with Examples 24 to 30.

TABLE 6

Example 31, Example 32, and Comparative Example 9

| | Loose bulk density (g/cm$^3$) | Average particle diameter (μm) | Adhesion force (nN) | Adhesion force measurement condition |
|---|---|---|---|---|
| Example 31 | 0.189 | 7.2 | 2.1 | Condition 2 |
| Example 32 | 0.193 | 7.9 | 1.1 | Condition 2 |
| Comparative Example 9 | 0.130 | 6.5 | 2.9 | Condition 2 |

As shown in Table 6 above, when the powdered fat and/or oil compositions A of the present invention were used (Example 31 and 32), favorable adhesion forces were obtained which were equivalent to that of calcium stearate conventionally used as an adhesive for food. Thus, it was found out that the powdered fat and/or oil composition A of the present invention is widely utilizable in foods, while keeping the property equivalent to that of the conventional adhesive for food.

<Adhesion Test to Glass Beads>

Figure 11:
FIG. 11 shows micrographs in which 1% by mass of (a) a powdered fat and/or oil composition of Example 24 of the present invention and 1% by mass of (b) calcium stearate of Comparative Example 9 adhere to surfaces of glass beads.
Figure 11:
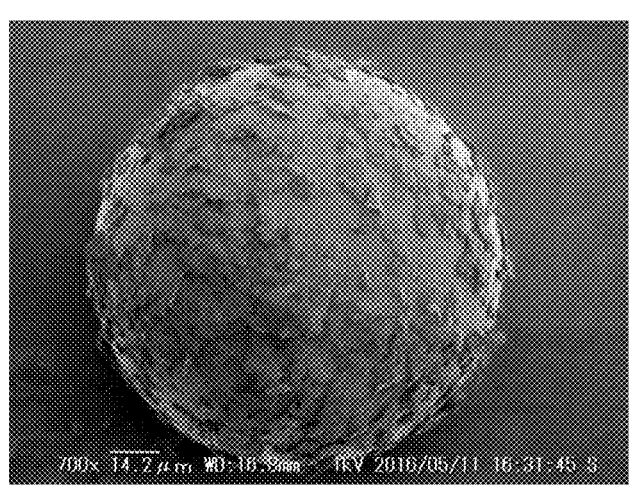

The compositions of Example 24 and Comparative Example 9 were made to adhere to glass beads (manufactured by AS ONE Corporation, cat. no. BZ-01, dimension of 0.105 to 0.125 mmφ), and observed with an electron microscope. In FIG. 11, 1% by mass of each composition adhered relative to 100% by mass of the glass beads. The test result revealed that the coating properties of the powdered fat and/or oil composition A of Example 24 of the present invention were excellent and comparable to the coating properties of Comparative Example 9. To put it differently, it was found out that the powdered fat and/or oil composition A of the present invention substitutes for a well-known adhesive of calcium stearate.

<Moisture-Absorption Suppression and Caking Prevention Test>

According to the formula table of Table 7 below, powders of Example 33, Comparative Example 10, and Reference Example 1 (the following powders coated with a coating) were prepared. The raw materials in Table 7 were weighed, then put in a 100-ml beaker, and well mixed, so that a powder (caster sugar, average particle diameter of 100 μm: manufactured by Mitsui Sugar Co., Ltd.) was coated with the powdered fat and/or oil composition A or a hydrogenated palm oil. Thus, the aforementioned powders were produced. After left standing at room temperature (20° C.) for 30 minutes, the content of each beaker was transferred to a funnel (mouth diameter: 90 mm, the height of the conical portion: 70 mm, stem diameter: 10 mm, stem length: 90 mm) to measure a time (seconds) until all the powder fell from the funnel. Table 8 shows the evaluation result. It can be understood that the shorter the time until all the powder fell, the more the moisture absorption is suppressed and the caking is prevented.

TABLE 7

|  | Example 33 (g) | Comparative Example 10 (g) | Reference Example 1 (g) |
| --- | --- | --- | --- |
| Powdered fat and/or oil composition A (that in Example 21 was used) | 1.0 | — |  |
| Hydrogenated palm oil | — | 1.0 |  |
| Powder (caster sugar) | 9.0 | 9.0 | 10.0 |
| Total | 10.0 | 10.0 | 10.0 |

TABLE 8

|  | Time (sec.) until all fell |
| --- | --- |
| Example 33 | 1.6 |
| Comparative Example 10 | 6.0 |
| Reference Example 1 | * |

* solidified in an upper portion of the funnel and did not fall.

As apparent from the result of Table 8, it was found out that the powder produced by using the powdered fat and/or oil composition A of the present invention suppressed the moisture absorption and prevented the caking in comparison with the powder produced by using the normal hydrogenated palm oil powder. To put it differently, it was verified that the powdered fat and/or oil composition A of the present invention acts as a coating and has excellent functions of preventing moisture absorption and caking.

<Powder Production and Storage Test>

The powders of Example 33, Comparative Example 10, and Reference Example 1 were produced according to the formulas in Table 7 again by weighing each raw material, then putting and mixing the materials in a beaker. After left standing at room temperature of 20° C. for 1 day, 4 days, and 7 days (after the storage test), each beaker was gripped by a hand, and gently shaken right and left six times. Such states were visually observed according to the following evaluation method. Table 9 shows the result of the storage test.

(Powder State Evaluation Method)

5: not solidified and felt smooth.
4: relative to 100% by mass of the entire powder, 10 to 30% by mass was solidified.
3: relative to 100% by mass of the entire powder, 30 to 60% by mass was solidified.
2: relative to 100% by mass of the entire powder, 60 to 90% by mass was solidified.
1: mostly solidified.

TABLE 9

|  | Example 33 | Comparative Example 10 | Reference Example 1 |
| --- | --- | --- | --- |
| After 1 day | 5 | 2 | 1 |
| After 4 days | 4 | 2 | 1 |
| After 7 days | 4 | 1 | 1 |

As apparent from the result of Table 9, it was found out that the powder produced by using the powdered fat and/or oil composition A of the present invention suppressed the moisture absorption and prevented the caking in comparison with the powder produced by using the normal hydrogenated palm oil powder, like the result in Table 8. To put it differently, the storage test also verified that the powdered fat and/or oil composition A of the present invention acts as a coating and has excellent functions of preventing moisture absorption and caking.

The invention claimed is:

1. A powdered fat and/or oil composition comprising a fat and/or oil ingredient comprising at least one type of a XXX triglyceride having saturated fatty acid residues X, each with x carbon atoms, at positions 1 to 3 of glycerin, wherein
x number of carbon atoms is an integer selected from 10 to 22,
the fat and/or oil ingredient comprises a β-form fat and/or oil,
particles of the powdered fat and/or oil composition have a plate-like shape, and
the powdered fat and/or oil composition has a loose bulk density of 0.05 to 0.6 g/cm$^3$.

2. The powdered fat and/or oil composition according to claim 1, wherein the fat and/or oil ingredient is the β-form fat and/or oil.

3. The powdered fat and/or oil composition according to claim 1, comprising 50% by mass or more of the XXX triglyceride in the fat and/or oil ingredient, given that a total mass of the fat and/or oil ingredient is 100% by mass.

4. The powdered fat and/or oil composition according to claim 1, wherein the x number of carbon atoms is an integer selected from 16 to 18.

5. A food comprising the powdered fat and/or oil composition according to claim 1.

6. A method for producing a food, comprising blending the powdered fat/and or oil composition according to claim 1 with a target food.

7. A food quality improver comprising the powdered fat and/or oil composition according to claim 1 as an active ingredient.

8. An adhesive comprising the powdered fat and/or oil composition according to claim 1.

9. A method for producing an adhesive, comprising blending the powdered fat and/or oil composition according to claim 1 with an adhesive composition.

10. A coating comprising the powdered fat and/or oil composition according to claim 1.

11. A method for producing a coating on an article, comprising coating a surface of an article with the powdered fat and/or oil composition according to claim 1.

12. A method for producing a powdered fat and/or oil composition comprising a fat and/or oil ingredient comprising at least one type of a XXX triglyceride having saturated fatty acid residues X, each with x carbon atoms, at positions 1 to 3 of glycerin, wherein
- x number of carbon atoms is an integer selected from 10 to 22,
- at least a portion of the fat and/or oil ingredient is a β-form fat and/or oil,
- particles of the powdered fat and/or oil composition have a plate-like shape,
- the powdered fat and/or oil composition has a loose bulk density of 0.05 to 0.6 g/cm$^3$, and
- the method comprises the following steps of:
  - (a) preparing a fat and/or oil composition raw material containing a XXX triglyceride; and
  - (d) cooling and solidifying the fat and/or oil composition raw material to obtain a powdered fat and/or oil composition comprising a β-form fat and/or oil whose particles have a plate-like shape.

13. The method according to claim 12, comprising, as step (b), a step of heating the fat and/or oil composition raw material obtained in step (a) to melt the triglyceride incorporated in the fat and/or oil composition raw material, thereby obtaining the fat and/or oil composition raw material in a molten state.

14. The method according to claim 12, comprising a seeding step (c1), a tempering step (c2), and/or a pre-cooling step (c3), before step (d), wherein
- the seeding step (c1) includes adding 0.1 to 1 part by mass of the β-form fat and/or oil to 100 parts by mass of the fat and/or oil composition raw material during the cooling in step (d),
- the tempering step (c2) includes, before the cooling in step (d), a step of maintaining a temperature at a temperature lower than a cooling temperature in step (d), and
- the pre-cooling step (c3) includes a step of pre-cooling the fat and/or oil composition in the molten state used in step (d) at a temperature higher than the cooling temperature in step (d).

15. The method according to claim 12, wherein the powdered fat and/or oil composition obtained in step (d) is obtained by a step of (e) pulverizing a solid resulting after the cooling in step (d) to obtain a powdered fat and/or oil composition.

16. The method according to claim 12, wherein the XXX triglyceride is incorporated in an amount of 50% by mass or more, given that a total mass of the fat and/or oil ingredient is 100% by mass.

17. The method according to claim 12, wherein x number of carbon atoms is an integer selected from 16 to 18.

18. The method according to claim 12, wherein the cooling in step (d) is performed at a temperature not lower than a melting point of an α-form crystal corresponding to the β-form fat and/or oil.

* * * * *